United States Patent
Elshafie et al.

(10) Patent No.: US 11,665,672 B2
(45) Date of Patent: May 30, 2023

(54) TECHNIQUES FOR CHANNEL STATE INFORMATION FEEDBACK FOR SIDELINK COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/179,210

(22) Filed: Feb. 18, 2021

(65) Prior Publication Data

US 2022/0264530 A1 Aug. 18, 2022

(51) Int. Cl.
*H04W 4/00* (2018.01)
*H04W 72/02* (2009.01)
(Continued)

(52) U.S. Cl.
CPC .......... *H04W 72/02* (2013.01); *H04B 7/0626* (2013.01); *H04L 1/1819* (2013.01);
(Continued)

(58) Field of Classification Search
CPC ..... H04W 72/02; H04W 72/10; H04W 92/18; H04W 76/14; H04B 7/0626;
(Continued)

(56) References Cited

U.S. PATENT DOCUMENTS 10,601,567 B2 * 3/2020 Marinier ............... H04L 5/0055
11,470,676 B2 * 10/2022 Chen ..................... H04W 76/40
(Continued)

OTHER PUBLICATIONS

PANASONIC: "Remaining Issue on Physical Layer Structure for Sidelink in NR V2X", 3GPP Draft, 3GPP TSG RAN WG1 #100, R1-2000992, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020 Feb. 14, 2020 (Feb. 14, 2020), XP051853118, pp. 1-8, Retrieved from the Internet: URL: https://ftp.3gpp.org/tsg_ran/WG1_RL1/TSGR1_100_e/Docs/R1-2000992.zip [retrieved on Feb. 14, 2020] Section "Cyclic Shift Determination for PSFCH Sequence", p. 6.

(Continued)

*Primary Examiner* — Chuong T Ho
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may receive, from a second UE, a sidelink communication via a physical sidelink shared channel (PSSCH). The UE may transmit, to the second UE and based at least in part on the sidelink communication via the PSSCH, hybrid automatic repeat request acknowledgement (HARQ-ACK) feedback and channel state information (CSI) feedback on a single physical sidelink feedback channel (PSFCH) resource. Numerous other aspects are described.

30 Claims, 25 Drawing Sheets

(51) Int. Cl.
*H04B 7/06* (2006.01)
*H04L 1/1812* (2023.01)
*H04L 1/1867* (2023.01)
*H04L 27/26* (2006.01)
*H04W 72/56* (2023.01)
*H04W 92/18* (2009.01)

(52) U.S. Cl.
CPC ........ *H04L 1/1896* (2013.01); *H04L 27/2607* (2013.01); *H04W 72/56* (2023.01); *H04W 92/18* (2013.01)

(58) Field of Classification Search
CPC . H04L 1/1819; H04L 1/1896; H04L 27/2607; H04L 5/0094; H04L 5/0037; H04L 1/0031; H04L 1/1671; H04L 1/1854; H04L 5/0055; H04L 5/0057; H04L 1/0026
USPC .................................. 370/329.33, 329, 330
See application file for complete search history.

(56) References Cited

U.S. PATENT DOCUMENTS

| | | | | |
|---|---|---|---|---|
| 2018/0084480 | A1* | 3/2018 | Yasukawa | H04W 24/10 |
| 2018/0262377 | A1* | 9/2018 | Liu | H04L 1/1854 |
| 2020/0313743 | A1 | 10/2020 | Park | |
| 2021/0014831 | A1* | 1/2021 | Ryu | H04W 72/0493 |
| 2021/0028842 | A1 | 1/2021 | Kim et al. | |
| 2021/0288778 | A1* | 9/2021 | Park | H04L 1/1858 |
| 2021/0306089 | A1* | 9/2021 | Fehrenbach | H04L 5/0057 |
| 2022/0085923 | A1* | 3/2022 | Ye | H04L 1/1825 |
| 2022/0116171 | A1* | 4/2022 | Zhang | H04W 72/042 |
| 2022/0210768 | A1* | 6/2022 | Zhou | H04L 1/1896 |

OTHER PUBLICATIONS

Partial International Search Report—PCT/US2022/070224—ISA/EPO—dated Apr. 19, 2022.
VIVO: "Remaining Issues on Physical Layer Procedure for NR Sidelink", 3GPP Draft, 3GPP TSG RAN WG1 #100 Meeting, R1-2000321, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020 Feb. 14, 2020 (Feb. 14, 2020), XP051852810, pp. 1-17, Retrieved from the Internet: URL: https://ftp.3gpp.org/tsg_ran/WG1_RL1/TSGR1_100_e/Docs/R1-2000321.zip [retrieved on Feb. 14, 2020] Section 2.4 "Frequency/Code Domain PSFCH Resource Determination", p. 5-p. 6.
International Search Report and Written Opinion—PCT/US2022/070224—ISA/EPO—dated Jun. 14, 2022.

* cited by examiner

TECHNIQUES FOR CHANNEL STATE INFORMATION FEEDBACK FOR SIDELINK COMMUNICATIONS

FIELD OF THE DISCLOSURE

Aspects of the present disclosure generally relate to wireless communication and to techniques and apparatuses for channel state information (CSI) feedback for sidelink communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a second UE, a sidelink communication via a physical sidelink shared channel (PSSCH); and transmitting, to the second UE and based at least in part on the sidelink communication via the PSSCH, hybrid automatic repeat request acknowledgement (HARQ-ACK) feedback and channel state information (CSI) feedback on a single physical sidelink feedback channel (PSFCH) resource.

In some aspects, the method includes selecting a cyclic shift value for transmitting the HARQ-ACK feedback and the CSI feedback based at least in part on a bit value associated with the HARQ-ACK feedback and a bit value associated with the CSI feedback.

In some aspects, the selection of the cyclic shift value is from a group of cyclic shift values associated with equal distances between other cyclic shift values in the group.

In some aspects, the selection of the cyclic shift value is from a group of cyclic shift values associated with unequal distances between other cyclic shift values in the group.

In some aspects, the HARQ-ACK feedback is associated with a first bit and the CSI feedback is associated with a second bit.

In some aspects, the first bit is associated with a first priority level and the second bit is associated with a second priority level.

In some aspects, the first bit is associated with a most significant bit and the second bit is associated with a least significant bit.

In some aspects, the first bit is associated with a least significant bit and the second bit is associated with a most significant bit.

In some aspects, the HARQ-ACK feedback is associated with a first bit and the CSI feedback is associated with two or more bits.

In some aspects, the transmission of the CSI feedback uses two or more PSFCH resources, a same HARQ-ACK feedback is associated with each of the two or more PSFCH resources, and different CSI feedbacks are associated with each of the two or more PSFCH resources.

In some aspects, the transmission of the HARQ-ACK feedback and the CSI feedback uses two or more PSFCH resources, a first subset of the two or more PSFCH resources is associated with the HARQ-ACK feedback and a second subset of the two or more PSFCH resources are associated with the CSI feedback.

In some aspects, the method includes transmitting additional CSI feedback in place of the HARQ-ACK feedback based at least in part on a negative acknowledgement (NACK)-only decoding feedback configuration associated with the first UE, wherein a NACK bit is repurposed to convey the additional CSI feedback.

In some aspects, the CSI indicates one or more of: a demodulation reference signal received power, a channel quality indicator or a modulation and coding scheme based at least in part on the sidelink communication received from the second UE, a redundancy version index for a retransmission of the sidelink communication, or a data rank.

In some aspects, the method includes receiving, from a base station via radio resource control signaling or via a medium access control control element (MAC-CE), an indication of quantization levels of parameters associated with the CSI feedback.

In some aspects, the first UE is a source UE and the second UE is a relay UE.

In some aspects, the first UE is a relay UE and the second UE is a source UE.

In some aspects, the sidelink communication is a first sidelink communication, and further comprising: receiving, from the second UE, a second sidelink communication based at least in part on the HARQ-ACK feedback and the CSI feedback.

In some aspects, the method includes receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and performing the subsequent transmission to the base station based at least in part on the redundancy version index.

In some aspects, the method includes transmitting, to the second UE, an indication of a redundancy version for the second UE to apply when the second UE is performing the sidelink communication with the first UE; and receiving the sidelink communication comprises receiving the sidelink communication based at least in part on the redundancy version.

In some aspects, the method includes transmitting, to the second UE, an indication of a redundancy version for the second UE to apply when the second UE is performing the sidelink communication with the first UE; and receiving the sidelink communication comprises receiving the sidelink communication via a groupcast communication based at least in part on the redundancy version.

In some aspects, the method includes determining aggregated feedback information for a plurality of UEs, wherein the aggregated feedback information indicates CSI for the plurality of UEs; and performing a multicast transmission to the plurality of UEs based at least in part on the aggregated feedback information.

In some aspects, a method of wireless communication performed by a first UE includes transmitting, to a second UE, a sidelink communication via a PSSCH; and receiving, from the second UE and based at least in part on the sidelink communication, HARQ-ACK feedback and CSI feedback on a single PSFCH resource.

In some aspects, the first UE is a source UE and the second UE is a relay UE; or the first UE is a relay UE and the second UE is a source UE.

In some aspects, the sidelink communication is a first sidelink communication, and further comprising: transmitting, to the second UE, a second sidelink communication based at least in part on the HARQ-ACK feedback and the CSI feedback.

In some aspects, the method includes receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and performing the subsequent transmission to the base station based at least in part on the redundancy version index.

In some aspects, the method includes receiving, from the second UE, an indication of a redundancy version for the first UE to apply when performing the sidelink communication with the second UE; and wherein transmitting the sidelink communication comprises transmitting the sidelink communication based at least in part on the redundancy version.

In some aspects, the method includes receiving, from the second UE, an indication of a redundancy version for the first UE to apply when performing the sidelink communication with the second UE; and wherein transmitting the sidelink communication comprises transmitting the sidelink communication via a groupcast communication based at least in part on the redundancy version.

In some aspects, the method includes determining aggregated feedback information for a plurality of UEs, wherein the aggregated feedback information indicates CSI for the plurality of UEs; and performing a multicast transmission to the plurality of UEs based at least in part on the aggregated feedback information.

In some aspects, a first UE for wireless communication includes a memory and one or more processors operatively coupled to the memory, the memory and the one or more processors configured to: receive, from a second UE, a sidelink communication via a PSSCH; and transmit, to the second UE and based at least in part on the sidelink communication via the PSSCH, HARQ-ACK feedback and CSI feedback on a single PSFCH resource.

In some aspects, the memory and the one or more processors are further configured to: select a cyclic shift value for transmitting the HARQ-ACK feedback and the CSI feedback based at least in part on a bit value associated with the HARQ-ACK feedback and a bit value associated with the CSI feedback.

In some aspects, the selection of the cyclic shift value is from a group of cyclic shift values associated with equal distances between other cyclic shift values in the group.

In some aspects, the selection of the cyclic shift value is from a group of cyclic shift values associated with unequal distances between other cyclic shift values in the group.

In some aspects, the HARQ-ACK feedback is associated with a first bit and the CSI feedback is associated with a second bit.

In some aspects, the first bit is associated with a first priority level and the second bit is associated with a second priority level.

In some aspects, the first bit is associated with a most significant bit and the second bit is associated with a least significant bit.

In some aspects, the first bit is associated with a least significant bit and the second bit is associated with a most significant bit.

In some aspects, the HARQ-ACK feedback is associated with a first bit and the CSI feedback is associated with two or more bits.

In some aspects, the transmission of the CSI feedback uses two or more PSFCH resources, a same HARQ-ACK feedback is associated with each of the two or more PSFCH resources, and different CSI feedbacks are associated with each of the two or more PSFCH resources.

In some aspects, the transmission of the HARQ-ACK feedback and the CSI feedback uses two or more PSFCH resources, a first subset of the two or more PSFCH resources is associated with the HARQ-ACK feedback and a second subset of the two or more PSFCH resources are associated with the CSI feedback.

In some aspects, the memory and the one or more processors are further configured to: transmit additional CSI feedback in place of the HARQ-ACK feedback based at least in part on a NACK-only decoding feedback configuration associated with the first UE, wherein a NACK bit is repurposed to convey the additional CSI feedback.

In some aspects, the CSI indicates one or more of: a demodulation reference signal received power, a channel quality indicator or a modulation and coding scheme based at least in part on the sidelink communication received from the second UE, a redundancy version index for a retransmission of the sidelink communication, or a data rank.

In some aspects, the one or more processors are further configured to: receive, from a base station via radio resource control signaling or via a MAC-CE, an indication of quantization levels of parameters associated with the CSI feedback.

In some aspects, the first UE is a source UE and the second UE is a relay UE.

In some aspects, the first UE is a relay UE and the second UE is a source UE.

In some aspects, the sidelink communication is a first sidelink communication, and the memory and the one or more processors are further configured to: receive, from the second UE, a second sidelink communication based at least in part on the HARQ-ACK feedback and the CSI feedback.

In some aspects, the memory and the one or more processors are further configured to: receive, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and perform the subsequent transmission to the base station based at least in part on the redundancy version index.

In some aspects, the memory and the one or more processors are further configured to: transmit, to the second UE, an indication of a redundancy version for the second UE to apply when the second UE is performing the sidelink communication with the first UE; and wherein the memory and the one or more processors, when receiving the sidelink communication, are configured to receive the sidelink communication based at least in part on the redundancy version.

In some aspects, the memory and the one or more processors are further configured to: transmit, to the second UE, an indication of a redundancy version for the second UE to apply when the second UE is performing the sidelink communication with the first UE; and wherein the memory and the one or more processors, when receiving the sidelink communication, are configured to receive the sidelink communication via a groupcast communication based at least in part on the redundancy version.

In some aspects, the memory and the one or more processors are further configured to: determine aggregated feedback information for a plurality of UEs, wherein the aggregated feedback information indicates CSI for the plurality of UEs; and perform a multicast transmission to the plurality of UEs based at least in part on the aggregated feedback information.

In some aspects, a first UE for wireless communication includes a memory and one or more processors operatively coupled to the memory, the memory and the one or more processors configured to: transmit, to a second UE, a sidelink communication via a PSSCH; and receive, from the second UE and based at least in part on the sidelink communication, HARQ-ACK feedback and CSI feedback on a single PSFCH resource.

In some aspects, the first UE is a source UE and the second UE is a relay UE; or the first UE is a relay UE and the second UE is a source UE.

In some aspects, the sidelink communication is a first sidelink communication, and the memory and the one or more processors are configured to: transmit, to the second UE, a second sidelink communication based at least in part on the HARQ-ACK feedback and the CSI feedback.

In some aspects, the memory and the one or more processors are further configured to: receive, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and perform the subsequent transmission to the base station based at least in part on the redundancy version index.

In some aspects, the memory and the one or more processors are further configured to: receive, from the second UE, an indication of a redundancy version for the first UE to apply when performing the sidelink communication with the second UE; and wherein the one or more processors, when transmitting the sidelink communication, are configured to transmit the sidelink communication based at least in part on the redundancy version.

In some aspects, the memory and the one or more processors are further configured to: receive, from the second UE, an indication of a redundancy version for the first UE to apply when performing the sidelink communication with the second UE; and wherein the memory and the one or more processors, when transmitting the sidelink communication, are configured to transmit the sidelink communication via a groupcast communication based at least in part on the redundancy version.

In some aspects, the memory and the one or more processors are further configured to: determine aggregated feedback information for a plurality of UEs, wherein the aggregated feedback information indicates CSI for the plurality of UEs; and perform a multicast transmission to the plurality of UEs based at least in part on the aggregated feedback information.

In some aspects, a non-transitory computer-readable medium storing a set of instructions for wireless communication includes one or more instructions that, when executed by one or more processors of a first UE, cause the first UE to: receive, from a second UE, a sidelink communication via a PSSCH; and transmit, to the second UE and based at least in part on the sidelink communication via the PSSCH, HARQ-ACK feedback and CSI feedback on a single PSFCH resource.

In some aspects, the one or more instructions further cause the first UE to: select a cyclic shift value for transmitting the HARQ-ACK feedback and the CSI feedback based at least in part on a bit value associated with the HARQ-ACK feedback and a bit value associated with the CSI feedback.

In some aspects, the selection of the cyclic shift value is from a group of cyclic shift values associated with equal distances between other cyclic shift values in the group.

In some aspects, the selection of the cyclic shift value is from a group of cyclic shift values associated with unequal distances between other cyclic shift values in the group.

In some aspects, the HARQ-ACK feedback is associated with a first bit and the CSI feedback is associated with a second bit.

In some aspects, the first bit is associated with a first priority level and the second bit is associated with a second priority level.

In some aspects, the first bit is associated with a most significant bit and the second bit is associated with a least significant bit.

In some aspects, the first bit is associated with a least significant bit and the second bit is associated with a most significant bit.

In some aspects, the HARQ-ACK feedback is associated with a first bit and the CSI feedback is associated with two or more bits.

In some aspects, the transmission of the CSI feedback uses two or more PSFCH resources, a same HARQ-ACK feedback is associated with each of the two or more PSFCH resources, and different CSI feedbacks are associated with each of the two or more PSFCH resources.

In some aspects, the transmission of the HARQ-ACK feedback and the CSI feedback uses two or more PSFCH resources, a first subset of the two or more PSFCH resources is associated with the HARQ-ACK feedback and a second subset of the two or more PSFCH resources are associated with the CSI feedback.

In some aspects, the one or more instructions further cause the first UE to: transmit additional CSI feedback in place of the HARQ-ACK feedback based at least in part on a NACK-only decoding feedback configuration associated with the first UE, wherein a NACK bit is repurposed to convey the additional CSI feedback.

In some aspects, the CSI indicates one or more of: a demodulation reference signal received power, a channel quality indicator or a modulation and coding scheme based at least in part on the sidelink communication received from the second UE, a redundancy version index for a retransmission of the sidelink communication, or a data rank.

In some aspects, the one or more instructions further cause the first UE to: receive, from a base station via radio resource control signaling or via a MAC-CE, an indication of quantization levels of parameters associated with the CSI feedback.

In some aspects, the first UE is a source UE and the second UE is a relay UE.

In some aspects, the first UE is a relay UE and the second UE is a source UE.

In some aspects, the one or more instructions further cause the first UE to: receive, from the second UE, a second sidelink communication based at least in part on the HARQ-ACK feedback and the CSI feedback.

In some aspects, the one or more instructions further cause the first UE to: receive, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and perform the subsequent transmission to the base station based at least in part on the redundancy version index.

In some aspects, the one or more instructions further cause the first UE to: transmit, to the second UE, an indication of a redundancy version for the second UE to apply when the second UE is performing the sidelink communication with the first UE; and wherein the one or more instructions, that cause the first UE to receive the sidelink communication, cause the first UE to receive the sidelink communication based at least in part on the redundancy version.

In some aspects, the one or more instructions further cause the first UE to: transmit, to the second UE, an indication of a redundancy version for the second UE to apply when the second UE is performing the sidelink communication with the first UE; and wherein the one or more instructions, that cause the first UE to receive the sidelink communication, cause the first UE to receive the sidelink communication via a groupcast communication based at least in part on the redundancy version.

In some aspects, the one or more instructions further cause the first UE to: determine aggregated feedback information for a plurality of UEs, wherein the aggregated feedback information indicates CSI for the plurality of UEs; and perform a multicast transmission to the plurality of UEs based at least in part on the aggregated feedback information.

In some aspects, a non-transitory computer-readable medium storing a set of instructions for wireless communication includes one or more instructions that, when executed by one or more processors of a first UE, cause the first UE to: transmit, to a second UE, a sidelink communication via a PSSCH; and receive, from the second UE and based at least in part on the sidelink communication, HARQ-ACK feedback and CSI feedback on a single PSFCH resource.

In some aspects, the first UE is a source UE and the second UE is a relay UE; or the first UE is a relay UE and the second UE is a source UE.

In some aspects, the one or more instructions further cause the first UE to: transmit, to the second UE, a second sidelink communication based at least in part on the HARQ-ACK feedback and the CSI feedback.

In some aspects, the one or more instructions further cause the first UE to: receive, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and perform the subsequent transmission to the base station based at least in part on the redundancy version index.

In some aspects, the one or more instructions further cause the first UE to: receive, from the second UE, an indication of a redundancy version for the first UE to apply when performing the sidelink communication with the second UE; and wherein the one or more instructions, that cause the first UE to transmit the sidelink communication, cause the first UE to transmit the sidelink communication based at least in part on the redundancy version.

In some aspects, the one or more instructions further cause the first UE to: receive, from the second UE, an indication of a redundancy version for the first UE to apply when performing the sidelink communication with the second UE; and wherein the one or more instructions, that cause the first UE to transmit the sidelink communication, cause the first UE to transmit the sidelink communication via a groupcast communication based at least in part on the redundancy version.

In some aspects, the one or more instructions further cause the first UE to: determine aggregated feedback information for a plurality of UEs, wherein the aggregated feedback information indicates CSI for the plurality of UEs; and perform a multicast transmission to the plurality of UEs based at least in part on the aggregated feedback information.

In some aspects, a first apparatus for wireless communication includes means for receiving, from a second apparatus, a sidelink communication via a PSSCH; and means for transmitting, to the second apparatus and based at least in part on the sidelink communication via the PSSCH, HARQ-ACK feedback and CSI feedback on a single PSFCH resource.

In some aspects, the apparatus includes means for selecting a cyclic shift value for transmitting the HARQ-ACK feedback and the CSI feedback based at least in part on a bit value associated with the HARQ-ACK feedback and a bit value associated with the CSI feedback.

In some aspects, the selection of the cyclic shift value is from a group of cyclic shift values associated with equal distances between other cyclic shift values in the group.

In some aspects, the selection of the cyclic shift value is from a group of cyclic shift values associated with unequal distances between other cyclic shift values in the group.

In some aspects, the HARQ-ACK feedback is associated with a first bit and the CSI feedback is associated with a second bit.

In some aspects, the first bit is associated with a first priority level and the second bit is associated with a second priority level.

In some aspects, the first bit is associated with a most significant bit and the second bit is associated with a least significant bit.

In some aspects, the first bit is associated with a least significant bit and the second bit is associated with a most significant bit.

In some aspects, the HARQ-ACK feedback is associated with a first bit and the CSI feedback is associated with two or more bits.

In some aspects, the transmission of the CSI feedback uses two or more PSFCH resources, a same HARQ-ACK feedback is associated with each of the two or more PSFCH resources, and different CSI feedbacks are associated with each of the two or more PSFCH resources.

In some aspects, the transmission of the HARQ-ACK feedback and the CSI feedback uses two or more PSFCH resources, a first subset of the two or more PSFCH resources is associated with the HARQ-ACK feedback and a second subset of the two or more PSFCH resources are associated with the CSI feedback.

In some aspects, the apparatus includes means for transmitting additional CSI feedback in place of the HARQ-ACK feedback based at least in part on a NACK-only decoding feedback configuration associated with the first apparatus, wherein a NACK bit is repurposed to convey the additional CSI feedback.

In some aspects, the CSI indicates one or more of: a demodulation reference signal received power, a channel quality indicator or a modulation and coding scheme based at least in part on the sidelink communication received from the second apparatus, a redundancy version index for a retransmission of the sidelink communication, or a data rank.

In some aspects, the apparatus includes means for receiving, from a base station via radio resource control signaling or via a MAC-CE, an indication of quantization levels of parameters associated with the CSI feedback.

In some aspects, the first apparatus is a source apparatus and the second apparatus is a relay apparatus.

In some aspects, the first apparatus is a relay apparatus and the second apparatus is a source apparatus.

In some aspects, the apparatus includes means for receiving, from the second apparatus, a second sidelink communication based at least in part on the HARQ-ACK feedback and the CSI feedback.

In some aspects, the apparatus includes means for receiving, from a base station via a physical downlink control channel, an indication of a redundancy version index for the first apparatus to apply when performing a subsequent transmission to the base station, wherein the redundancy version index is applicable to the first apparatus or to a group of apparatuses that includes the first apparatus and the second apparatus; and means for performing the subsequent transmission to the base station based at least in part on the redundancy version index.

In some aspects, the apparatus includes means for transmitting, to the second apparatus, an indication of a redundancy version for the second apparatus to apply when the second apparatus is performing the sidelink communication with the first apparatus; and wherein the means for receiving the sidelink communication comprises means for receiving the sidelink communication based at least in part on the redundancy version. the means for receiving the sidelink communication comprises means for receiving the sidelink communication based at least in part on the redundancy version.

In some aspects, the apparatus includes means for transmitting, to the second apparatus, an indication of a redundancy version for the second apparatus to apply when the second apparatus is performing the sidelink communication with the first apparatus; and wherein the means for receiving the sidelink communication comprises means for receiving the sidelink communication via a groupcast communication based at least in part on the redundancy version. the means for receiving the sidelink communication comprises means for receiving the sidelink communication via a groupcast communication based at least in part on the redundancy version.

In some aspects, the apparatus includes means for determining aggregated feedback information for a plurality of apparatuses, wherein the aggregated feedback information indicates CSI for the plurality of apparatuses; and means for performing a multicast transmission to the plurality of apparatuses based at least in part on the aggregated feedback information.

In some aspects, a first apparatus for wireless communication includes means for transmitting, to a second apparatus, a sidelink communication via a PSSCH; and means for receiving, from the second apparatus and based at least in part on the sidelink communication, HARQ-ACK feedback and CSI feedback on a single PSFCH resource.

In some aspects, the first apparatus is a source apparatus and the second apparatus is a relay apparatus; or the first apparatus is a relay apparatus and the second apparatus is a source apparatus.

In some aspects, the apparatus includes means for transmitting, to the second apparatus, a second sidelink communication based at least in part on the HARQ-ACK feedback and the CSI feedback.

In some aspects, the apparatus includes means for receiving, from a base station via a physical downlink control channel, an indication of a redundancy version index for the first apparatus to apply when performing a subsequent transmission to the base station, wherein the redundancy version index is applicable to the first apparatus or to a group of apparatuses that includes the first apparatus and the second apparatus; and means for performing the subsequent transmission to the base station based at least in part on the redundancy version index.

In some aspects, the apparatus includes means for receiving, from the second apparatus, an indication of a redundancy version for the first apparatus to apply when performing the sidelink communication with the second apparatus; and wherein the means for transmitting the sidelink communication comprises means for transmitting the sidelink communication based at least in part on the redundancy version. the means for transmitting the sidelink communication comprises means for transmitting the sidelink communication based at least in part on the redundancy version.

In some aspects, the apparatus includes means for receiving, from the second apparatus, an indication of a redundancy version for the first apparatus to apply when performing the sidelink communication with the second apparatus; and wherein the means for transmitting the sidelink communication comprises means for transmitting the sidelink communication via a groupcast communication based at least in part on the redundancy version. the means for transmitting the sidelink communication comprises means for transmitting the sidelink communication via a groupcast communication based at least in part on the redundancy version.

In some aspects, the apparatus includes means for determining aggregated feedback information for a plurality of apparatuses, wherein the aggregated feedback information indicates CSI for the plurality of apparatuses; and means for performing a multicast transmission to the plurality of apparatuses based at least in part on the aggregated feedback information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
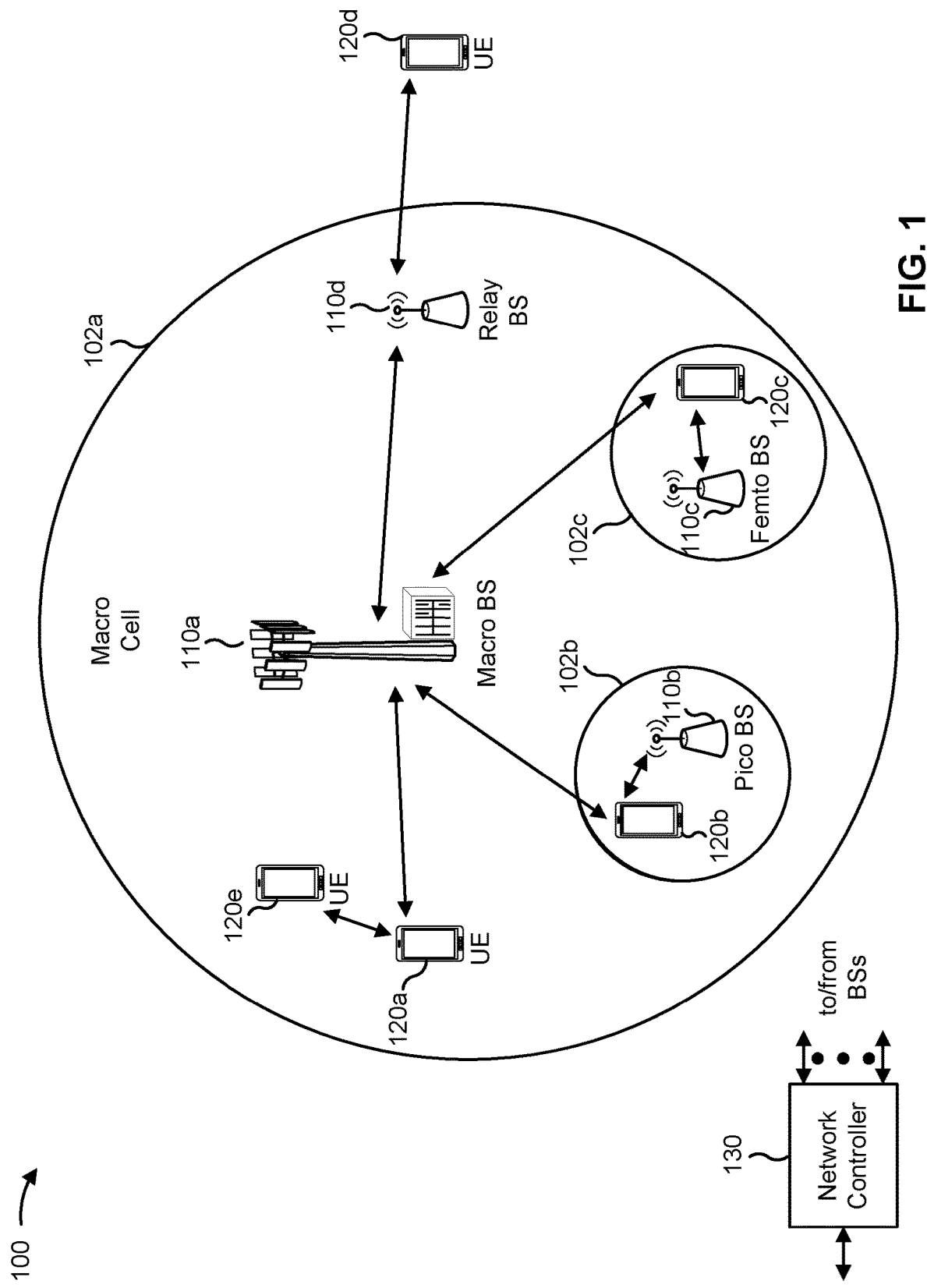
FIG. 1 is a diagram illustrating an example of a wireless network, in accordance with the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
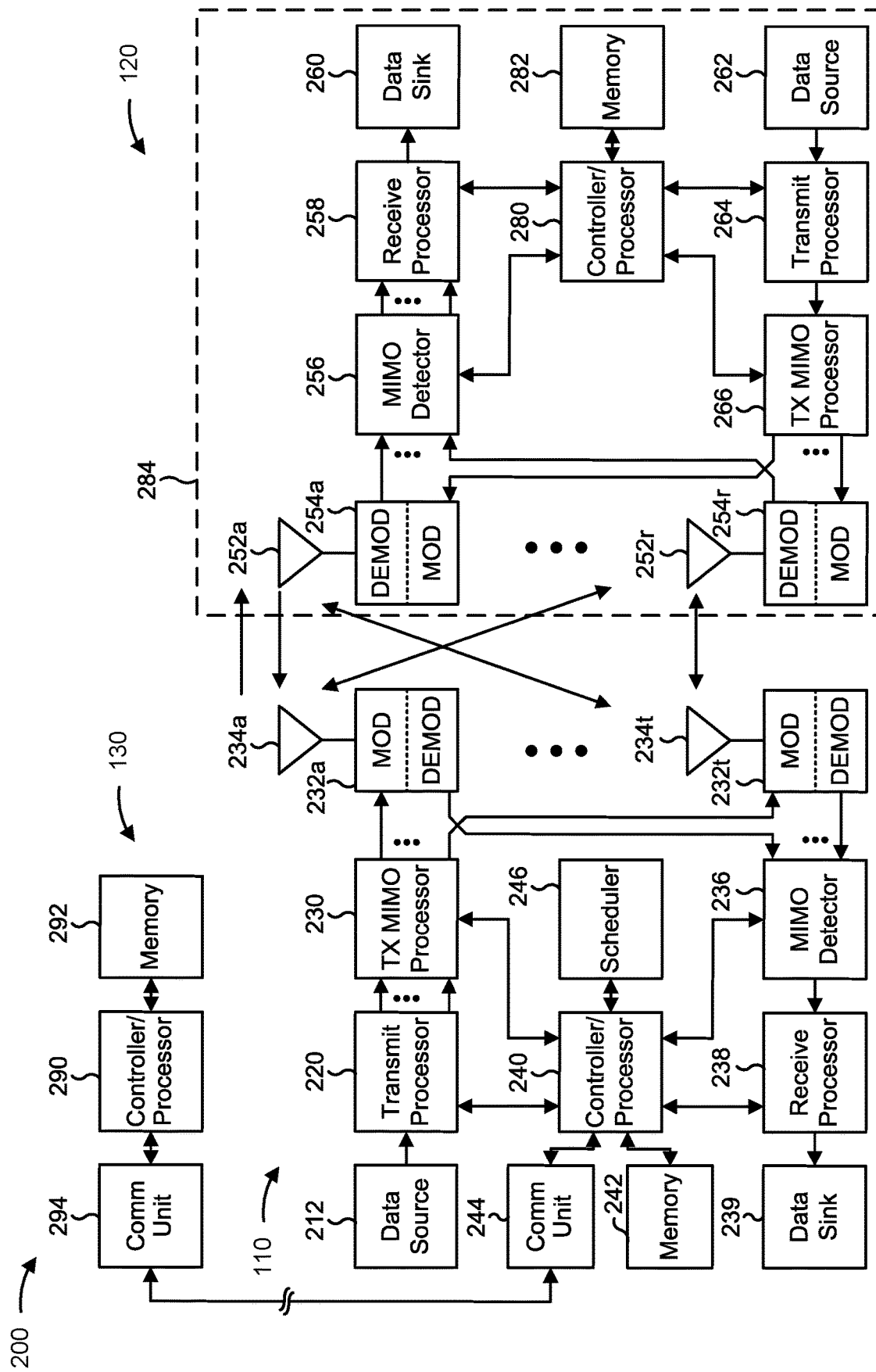
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with CSI feedback for sidelink communications, as described in more detail elsewhere herein. For example, controller/processor 240 of base station 110, controller/processor 280 of UE 120, and/or any other component(s) of FIG. 2 may perform or direct operations of, for example, process 2300 of FIG. 23, process 2400 of FIG. 24, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 2300 of FIG. 23, process 2400 of FIG. 24, and/or other processes as described herein. In some aspects, executing instructions may include running the instructions, converting the instructions, compiling the instructions, and/or interpreting the instructions.

In some aspects, a first UE (e.g., UE 120) includes means for receiving, from a second UE, a sidelink communication via a physical sidelink shared channel (PSSCH); and/or means for transmitting, to the second UE and based at least in part on the sidelink communication via the PSSCH, hybrid automatic repeat request acknowledgement (HARQ-ACK) feedback and channel state information (CSI) feedback on a single physical sidelink feedback channel (PSFCH) resource. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for selecting a cyclic shift value for transmitting the HARQ-ACK feedback and the CSI feedback based at least in part on a bit value associated with the HARQ-ACK feedback and a bit value associated with the CSI feedback.

In some aspects, the first UE includes means for transmitting additional CSI feedback in place of the HARQ-ACK feedback based at least in part on a negative acknowledgement (NACK)-only decoding feedback configuration associated with the first UE, wherein a NACK bit is repurposed to convey the additional CSI feedback.

In some aspects, the first UE includes means for receiving, from a base station via radio resource control signaling or via a medium access control control element (MAC-CE), an indication of quantization levels of parameters associated with the CSI feedback.

In some aspects, the first UE includes means for receiving, from the second UE, a second sidelink communication based at least in part on the HARQ-ACK feedback and the CSI feedback.

In some aspects, the first UE includes means for receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and/or means for performing the subsequent transmission to the base station based at least in part on the redundancy version index.

In some aspects, the first UE includes means for transmitting, to the second UE, an indication of a redundancy version for the second UE to apply when the second UE is performing the sidelink communication with the first UE; or In some aspects, the first UE includes means for transmitting, to the second UE, an indication of a redundancy version for the second UE to apply when the second UE is performing the sidelink communication with the first UE; or In some aspects, the first UE includes means for determining aggregated feedback information for a plurality of UEs, wherein the aggregated feedback information indicates CSI for the plurality of UEs; and/or means for performing a multicast transmission to the plurality of UEs based at least in part on the aggregated feedback information.

In some aspects, a first UE (e.g., UE 120*a*) includes means for transmitting, to a second UE, a sidelink communication via a PSSCH; and/or means for receiving, from the second UE and based at least in part on the sidelink communication, HARQ-ACK feedback and CSI feedback on a single PSFCH resource. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for transmitting, to the second UE, a second sidelink communication based at least in part on the HARQ-ACK feedback and the CSI feedback.

In some aspects, the first UE includes means for receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and/or means for performing the subsequent transmission to the base station based at least in part on the redundancy version index.

In some aspects, the first UE includes means for determining aggregated feedback information for a plurality of UEs, wherein the aggregated feedback information indicates CSI for the plurality of UEs; and/or means for performing a multicast transmission to the plurality of UEs based at least in part on the aggregated feedback information.

As indicated above, FIG. 2 is provided as an example. Other examples may differ from what is described with regard to FIG. 2.

Figure 3:
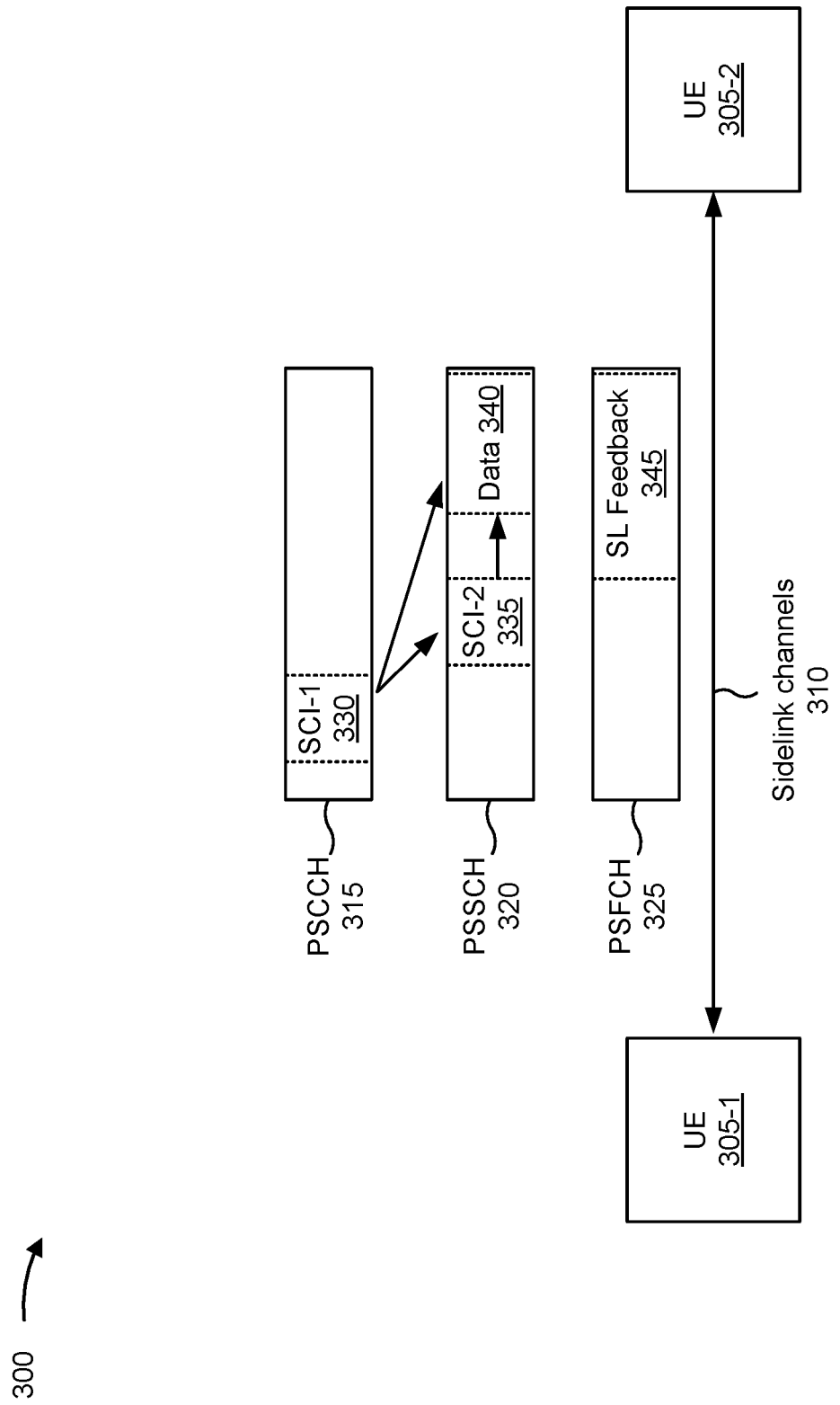
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may include one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a PSSCH 320, and/or a PSFCH 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry SCI-1 330, which may indicate various control information used for sidelink communications. The control information may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH demodulation reference signal (DMRS) pattern, an sidelink control information (SCI) format and a beta offset for SCI-2 335 transmitted on the PSSCH 320, a quantity of PSSCH DMRS ports, an MCS, and/or the like.

The information carried on the PSSCH 320 may include the SCI-2 335 and/or data 340. The SCI-2 335 may include various types of information, such as a HARQ process ID, a new data indicator (NDI) associated with the data 340, a source identifier, a destination identifier, a CSI report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

As indicated above, FIG. 3 is provided as an example. Other examples may differ from what is described with respect to FIG. 3.

Figure 4:
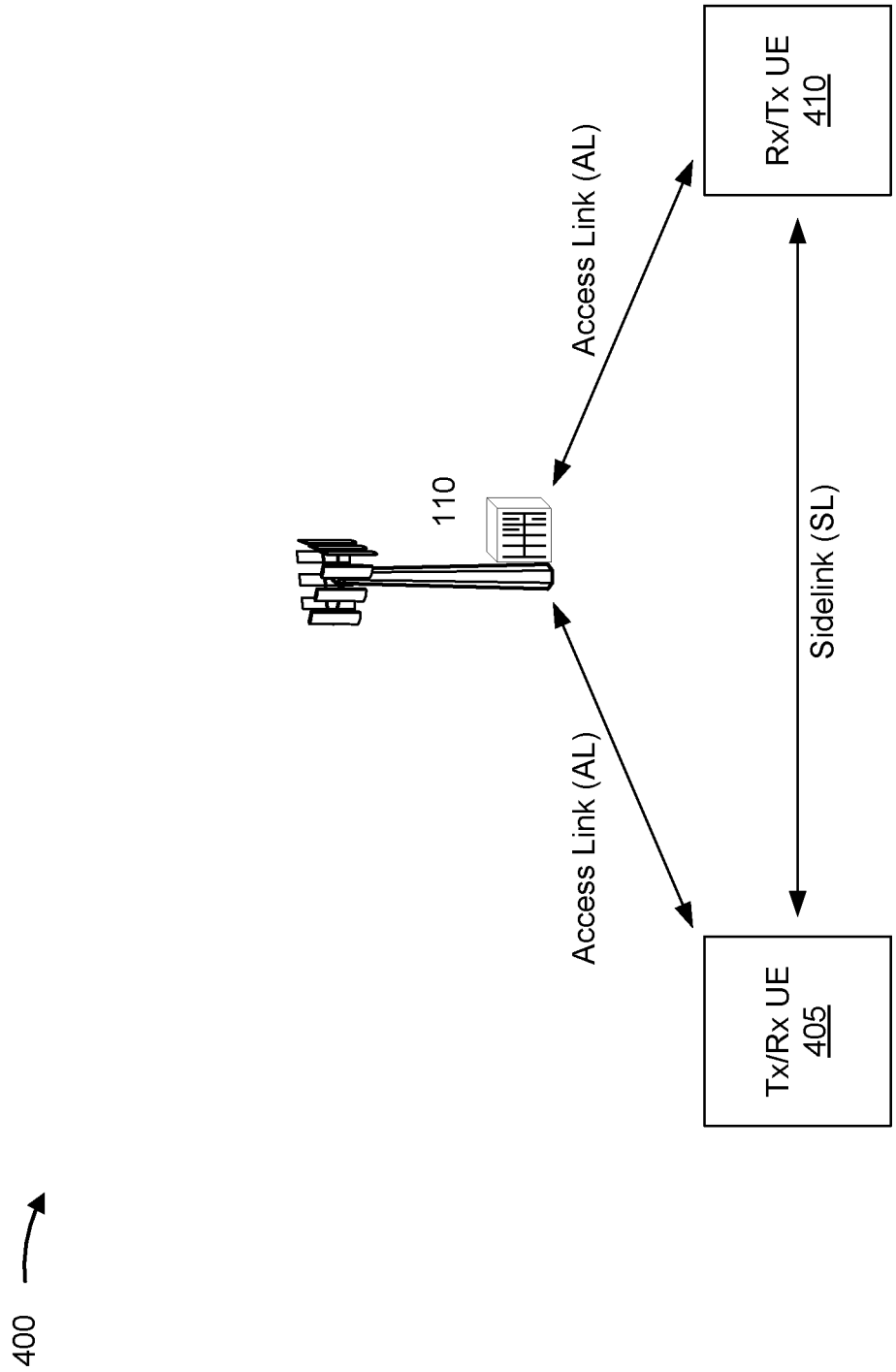
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a Tx/Rx UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Sidelink communications may occur in transmission and/or reception resource pools. A minimum resource allocation unit in frequency may be a sub-channel. A resource allocation in time may be a slot. A slot may or may not be available for sidelink. A slot may or may not include feedback resources. A radio resource control (RRC) configuration that configures slots for a UE may be based at least in part on a pre-configuration (e.g., preloaded on the UE) or a configuration (e.g., from a base station).

Figure 5:
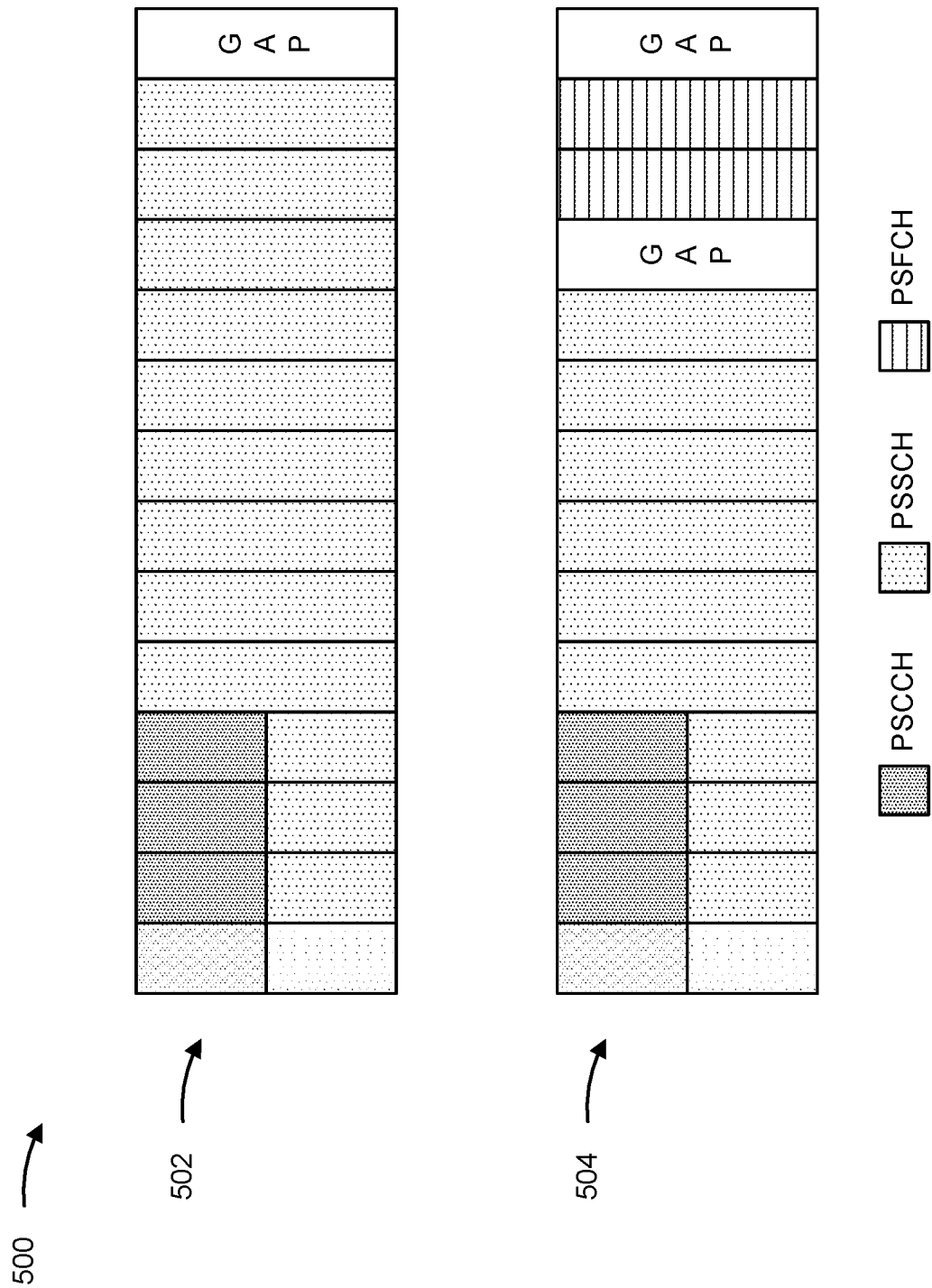
FIG. 5 is a diagram illustrating an example of a slot structure, in accordance with the present disclosure.

FIG. 5 is a diagram illustrating an example 500 of a slot structure, in accordance with the present disclosure.

As shown by reference number 502, a slot may be configured without feedback resources. The slot may include 14 OFDM symbols. Sidelink may be (pre)configured to occupy fewer than 14 symbols in a slot. A first symbol in the slot may be repeated on a preceding symbol for automatic gain control (AGC) purposes. The slot may include a PSCCH and a PSSCH. A gap symbol may be present after the PSSCH. A sub-channel size may be (pre)configured to {10, 15, 20, 25, 50, 75, 100} physical resource blocks (PRBs). The PSCCH and the PSSCH may be transmitted in the same slot.

As shown by reference number 504, a slot may be configured with feedback resources. The slot may include 14 OFDM symbols. The slot may include a PSCCH, a PSSCH, and a PSFCH. Resources for the PSFCH may be configured with a period of {0, 1, 2, 4} slots. The PSFCH may include two OFDM symbols, which may include a first OFDM symbol dedicated to the PSFCH and a second OFDM symbol for AGC purposes. A gap symbol may be present after the PSFCH.

As indicated above, FIG. 5 is provided as an example. Other examples may differ from what is described with respect to FIG. 5.

SCI may be in two stages for forward compatibility. The SCI may include SCI-1 and SCI-2. The SCI-1 may be transmitted on a PSCCH and may include information for resource allocation and for decoding the SCI-2. The SCI-2 may be transmitted on the PSSCH and may include information for decoding data via a shared channel. Both the SCI-1 and the SCI-2 may use PDCCH polar codes to improve reliability.

SCI-1 may include priority information (e.g., QoS values), a PSSCH resource assignment (e.g., frequency/time resources for the PSSCH), a resource reservation period (if enabled), a PSSCH DMRS pattern (if more than one pattern is (pre)configured), an SCI-2 format (e.g., information associated with a size of the SCI-2), a two-bit beta offset for an SCI-2 resource allocation, a number of PSSCH DMRS ports (e.g., one or two), and/or a 5-bit MCS.

SCI-2 formats may include a HARQ process ID, an NDI, a source ID, a destination ID, and/or a CSI report trigger (applicable to unicast), which may be used to determine a new transport block or a transport block retransmission. SCI-2 formats may include, for a groupcast option associated with a NACK-only distance-based feedback, a zone ID indicating a location of a transmitter and/or a maximum communication range for sending feedback.

A PSCCH duration may be (pre)configured to be two or three symbols. The PSCCH may be (pre)configured to span {10, 12, 15, 20, 25} PRBs, and may be limited to a single sub-channel. A DMRS may be present in every PSCCH symbol and may be placed on every fourth resource element (RE). A frequency domain orthogonal cover code (FD-OCC) may be applied to the DMRS to reduce an impact of colliding PSCCH transmissions. A transmitter UE may randomly select from a set of pre-defined FD-OCCs. A starting symbol for the PSCCH may be a second symbol in a slot (e.g., after a first symbol which may be used for AGC).

Figure 6:
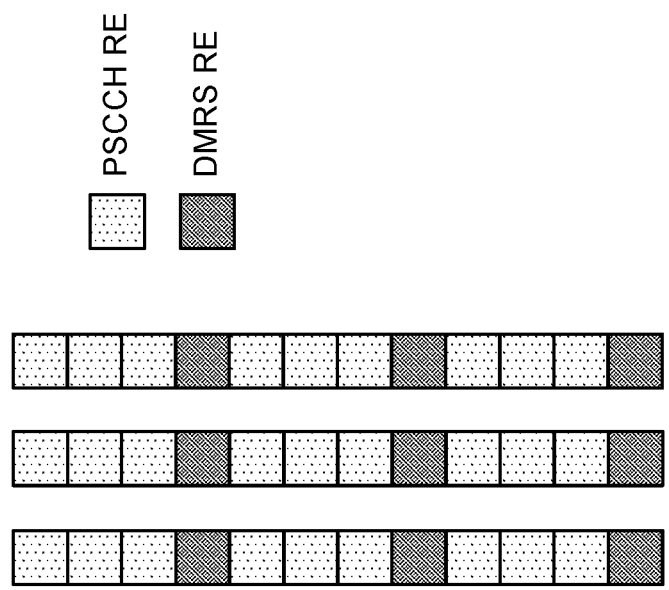
FIG. 6 is a diagram illustrating an example of demodulation reference signal (DMRS) resource elements, in accordance with the present disclosure.

FIG. 6 is a diagram illustrating an example 600 of DMRS resource elements, in accordance with the present disclosure.

As shown in FIG. 6, a plurality of PSCCH REs may be in a frequency domain. A DMRS may be present in a PSCCH symbol (e.g., in every PSCCH symbol). The DMRS may occur in every fourth RE. In other words, three PSCCHs REs in the frequency domain may be followed by a single DMRS RE, and so on.

As indicated above, FIG. 6 is provided as an example. Other examples may differ from what is described with respect to FIG. 6.

One and two layer transmissions may be supported with quadrature phase shift keying (QPSK), 16-quadrature amplitude modulation (16-QAM), 64-QAM, and/or 256-QAM. Two-symbol, three-symbol, and/or four-symbol DMRS patterns may be (pre)configured for use by a transmitter. The transmitter may select a DMRS pattern and may transmit an indication of the DMRS pattern in SCI-1, according to channel conditions. Further, DMRS patterns for a 9-symbol PSSCH and/or a 12-symbol PSSCH may be defined.

Figure 7:
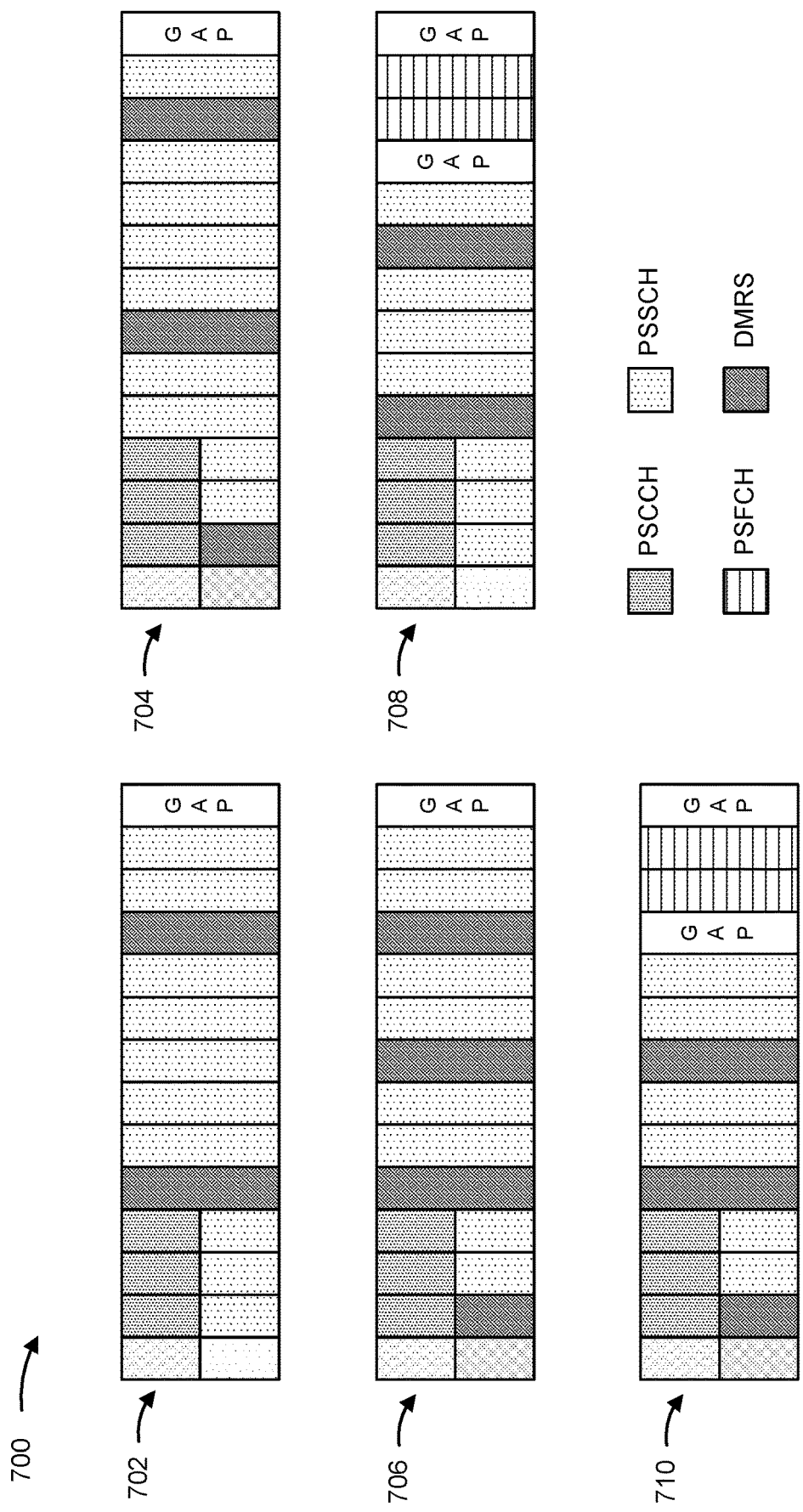
FIG. 7 is a diagram illustrating an example of demodulation reference signal (DMRS) patterns, in accordance with the present disclosure.

FIG. 7 is a diagram illustrating an example 700 of DMRS patterns, in accordance with the present disclosure.

As shown by reference number 702, a two-symbol DMRS pattern may include a first DMRS in symbol 3 and a second DMRS in symbol 10.

As shown by reference number 704, a three-symbol DMRS pattern may include a first DMRS in symbol 1, a second DMRS in symbol 6, and a third DMRS in symbol 11.

As shown by reference number 706, a four-symbol DMRS pattern may include a first DMRS in symbol 1, a second DMRS in symbol 4, a third DMRS in symbol 7, and a fourth DMRS in symbol 10.

As shown by reference number 708, a two-symbol DMRS pattern may include a first DMRS in symbol 4 and a second DMRS in symbol 8.

As shown by reference number 710, a three-symbol DMRS pattern may include a first DMRS in symbol 1, a second DMRS in symbol 4, and a third DMRS in symbol 7.

As indicated above, FIG. 7 is provided as an example. Other examples may differ from what is described with respect to FIG. 7.

Figure 8:
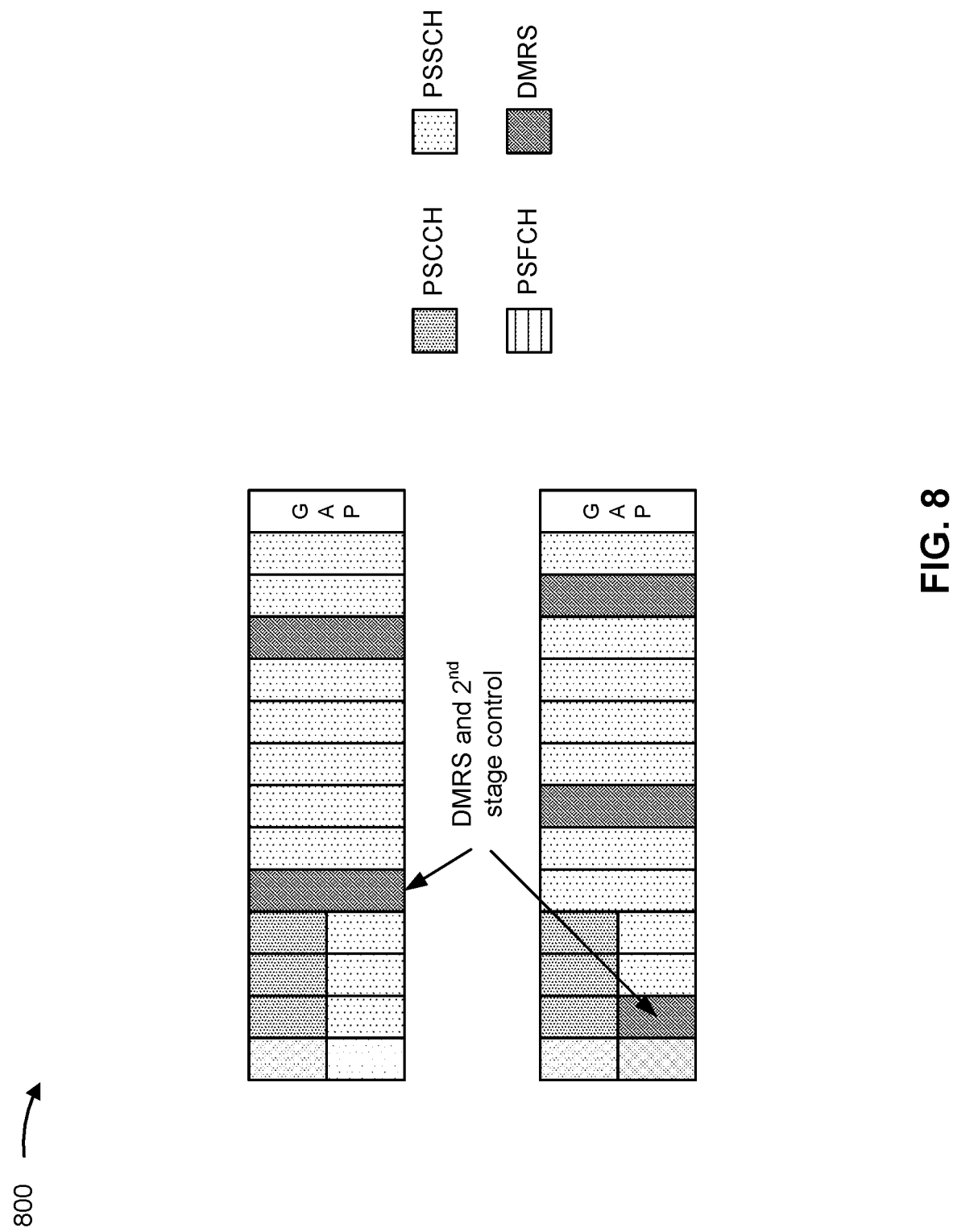
FIG. 8 is a diagram illustrating an example of sidelink control information, in accordance with the present disclosure.

FIG. 8 is a diagram illustrating an example 800 of sidelink control information, in accordance with the present disclosure.

As shown in FIG. 8, SCI-2 may be mapped to contiguous resource blocks in a PSSCH starting from a first symbol with a PSSCH DMRS. SCI-2 may be scrambled separately from a sidelink shared channel (SL-SCH) and may use QPSK. SCI-2 may not be associated with blind decoding, since an SCI-2 format may be indicated in SCI-1, a number of REs may be derived from SCI-1 content, and a starting location may be known. When an SL-SCH transmission is on two layers, SCI-2 modulation symbols may be copied on both layers.

As indicated above, FIG. 8 is provided as an example. Other examples may differ from what is described with respect to FIG. 8.

Feedback resources may be system wide. The feedback resources may be (pre)configured with a period N={1, 2, 4} slots. Three OFDM symbols may be occupied when the feedback resources are configured, where the three OFDM symbols includes one gap symbol and two PSFCH symbols. A number of PRBs for an actual PSFCH may be (pre) configured based at least in part on a bitmap.

A PUCCH format 0 on one resource block may carry HARQ-ACK information for a single PSSCH transmission. A PSFCH format 0 sequence may be repeated on two PSFCH symbols. A PSFCH may be enabled for unicast and groupcast. A PSFCH for unicast may include a one-bit ACK/NACK. A PSFCH for groupcast may be associated with two feedback modes, where a first feedback mode may be associated with a receiver UE transmitting only a NACK, and a second feedback mode may be associated with a receiver UE transmitting an ACK or a NACK.

Figure 9:
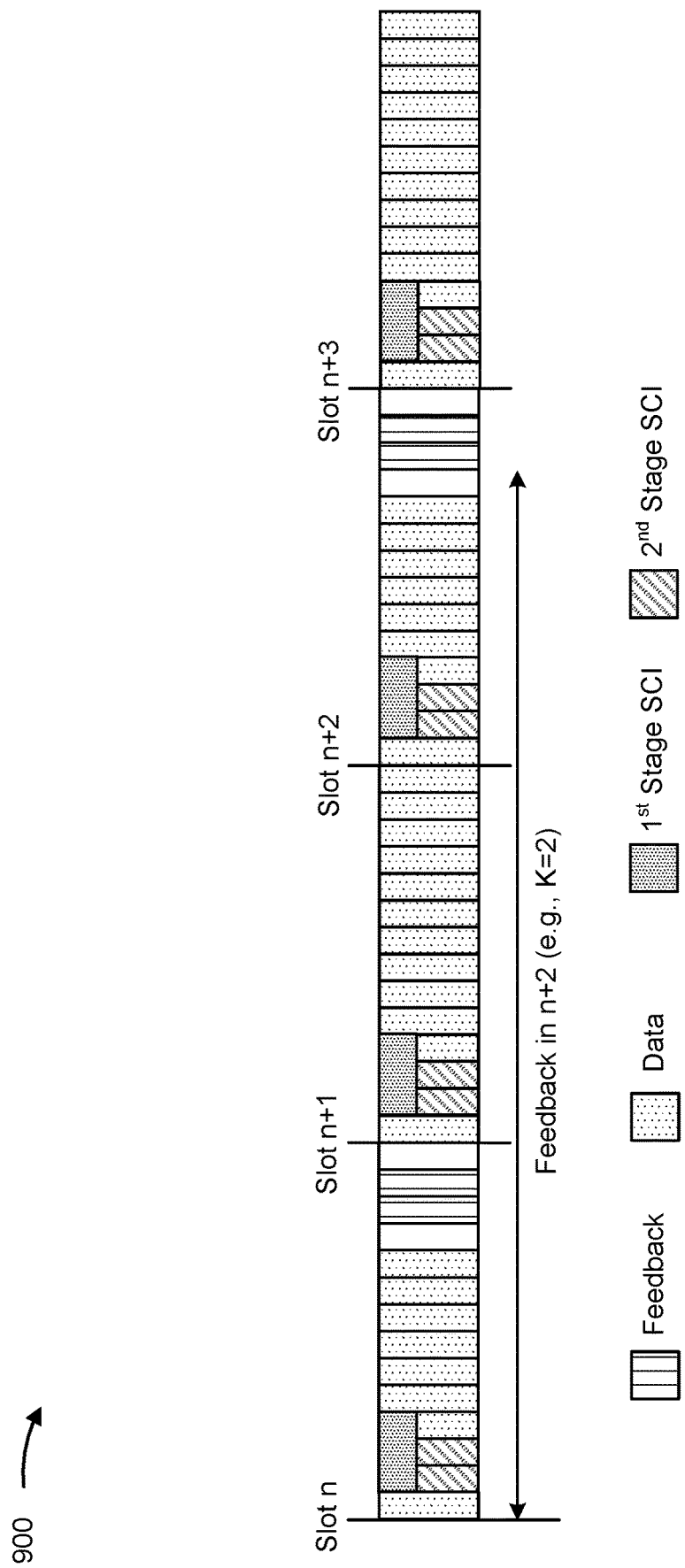
FIG. 9 is a diagram illustrating an example of a physical sidelink feedback channel (PSFCH) in a slot, in accordance with the present disclosure.

FIG. 9 is a diagram illustrating an example 900 of a PSFCH in a slot, in accordance with the present disclosure.

A shown in FIG. 9, a first slot (slot n) and a third slot (slot n+2) may include three symbols associated with SCI-1, two symbols associated with SCI-2, two symbols associated with a PSFCH, a plurality of data symbols, and a pair of gap symbols surrounding the PSFCH. A second slot (slot n+1) and a fourth slot (slot n+3) may include three symbols associated with SCI-1, two symbols associated with SCI-2, and a plurality of data symbols.

As indicated above, FIG. 9 is provided as an example. Other examples may differ from what is described with respect to FIG. 9.

Figure 10:
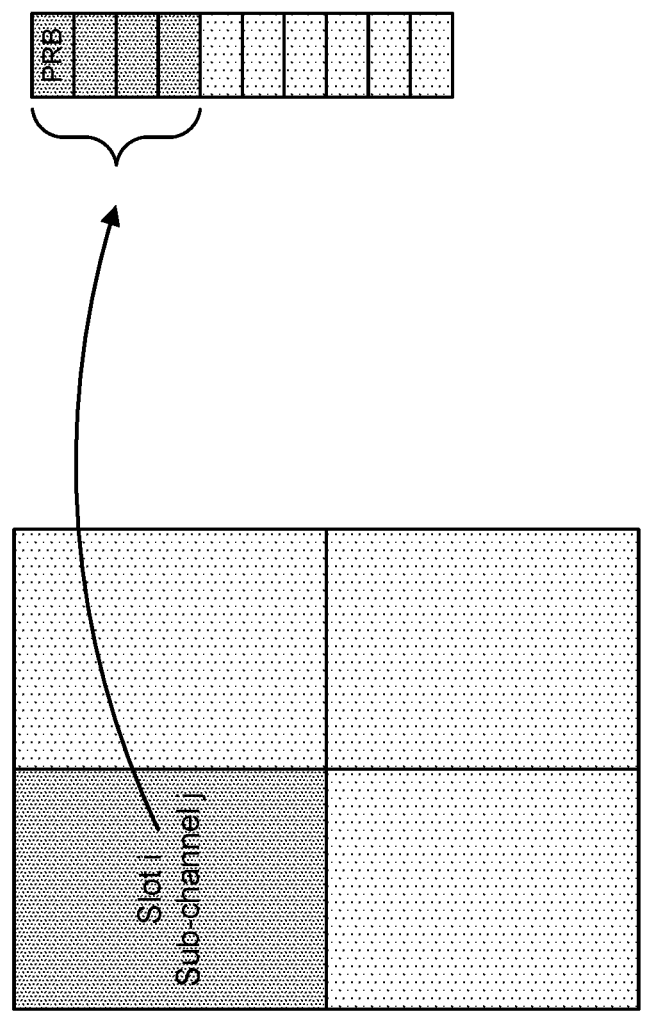
FIG. 10 is a diagram illustrating an example of a PSFCH resource mapping, in accordance with the present disclosure.

FIG. 10 is a diagram illustrating an example 1000 of a PSFCH resource mapping, in accordance with the present disclosure.

As shown in FIG. 10, a PSSCH may be mapped to a corresponding PSFCH resource based at least in part on a PSFCH resource mapping. The mapping between the PSSCH and the corresponding PSFCH resource may be based at least in part on a starting sub-channel of the PSSCH, a slot containing the PSSCH, a source ID, and/or a destination ID. A number of available PSFCH resources may be equal to or greater than a number of UEs in a second groupcast option.

As indicated above, FIG. 10 is provided as an example. Other examples may differ from what is described with respect to FIG. 10.

Figure 11:
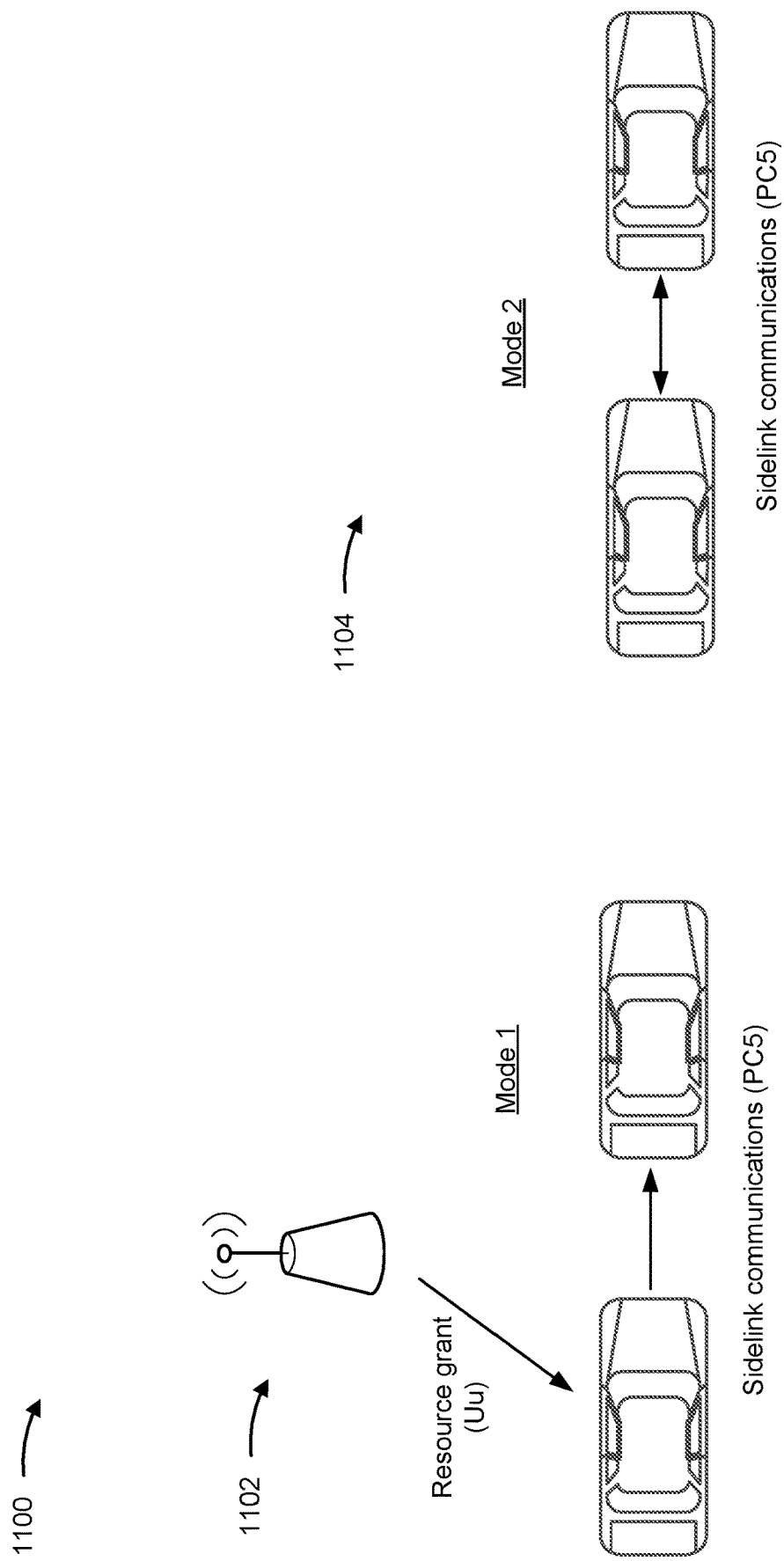
FIG. 11 is a diagram illustrating an example of sidelink operating modes, in accordance with the present disclosure.

FIG. 11 is a diagram illustrating an example 1100 of sidelink operating modes, in accordance with the present disclosure.

As shown by reference number 1102, a first resource allocation mode in NR sidelink may involve a base station allocating resources for sidelink communications between UEs. For example, the base station may transmit a resource grant via a Uu interface to a first UE. The first UE may communicate with a second UE via a sidelink interface (e.g., a PC5 interface) based at least in part on the resource grant received from the base station.

As shown by reference number 1104, a second resource allocation mode in NR sidelink may involve UEs autonomously select sidelink resources. For example, the first UE may select a sidelink resource, and the first UE may communicate with the second UE based at least in part on the sidelink resource.

From a receiver perspective (e.g., a second UE that receives a sidelink communication from a first UE), there may be no difference between the first resource allocation mode and the second resource allocation mode. Further, NR sidelink may support HARQ-based retransmissions.

As indicated above, FIG. 11 is provided as an example. Other examples may differ from what is described with respect to FIG. 11.

Figure 12:
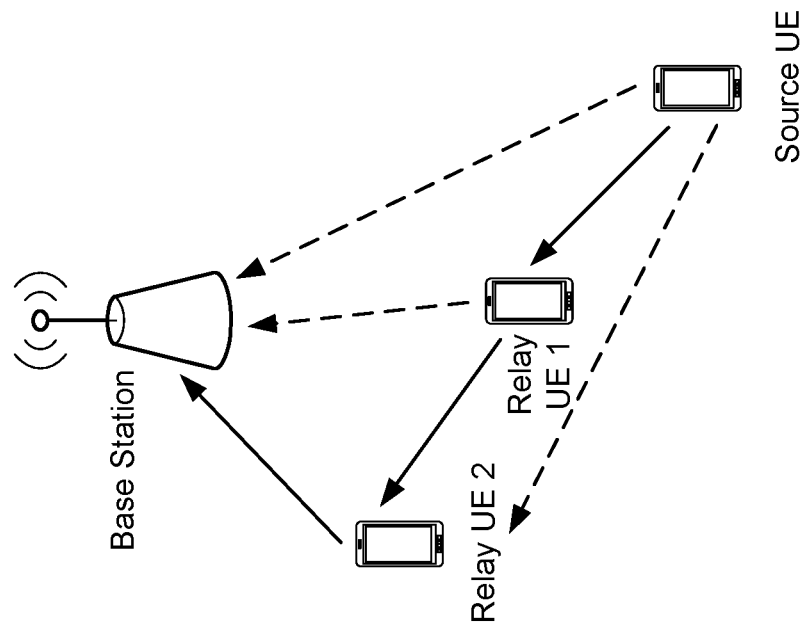
FIGS. 12-13 are diagrams illustrating examples of uplink tunneling via relays, in accordance with the present disclosure.

FIG. 12 is a diagram illustrating an example 1200 of uplink tunneling via relays, in accordance with the present disclosure.

One uplink coverage enhancement may involve dedicated uplink tunneling via UE relays. A base station may use broadcast and/or groupcast to set up a multi-hop tunnel via UE relays. The base station may set up the multi-hop tunnel in dedicated time and frequency resources. A number of hops may be limited to one or more remote UEs and/or one or more relay UEs, based at least in part on a base station implementation.

As shown in FIG. 12, a source UE, a first relay UE, and/or a second relay UE may receive, from a base station, groupcast signaling to set up an uplink relay tunnel. Based at least in part on the groupcast signaling, the source UE may send uplink data to the first relay UE. The first relay UE may forward the uplink data to the second relay UE. The second relay UE may forward the uplink data to the base station. As a result, the source UE may communicate the uplink data to the base station based at least in part on dedicated uplink tunneling via the first and second relay UEs.

A number of relaying configurations may be used for UEs. As an example, a UE may have a direct link to a base station and a next UE, but not to other UEs. As another example, a UE may have a direct link to other UEs, regardless of a hop number between the UE and the other UEs. As yet another example, UEs may be grouped into groups, where each group may communicate with a next group, and a single hop may be between groups.

As indicated above, FIG. 12 is provided as an example. Other examples may differ from what is described with respect to FIG. 12.

Figure 13:
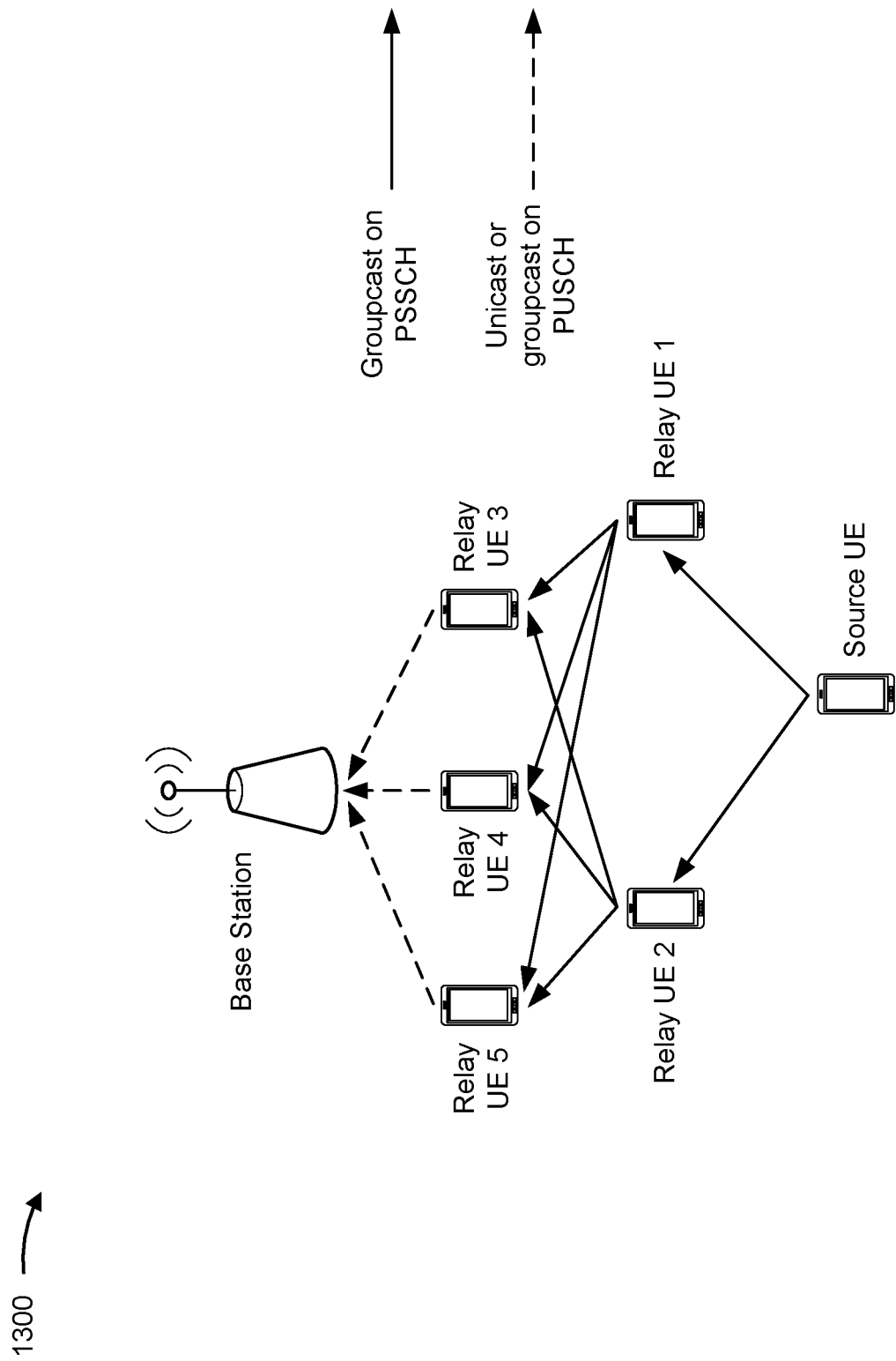

FIG. 13 is a diagram illustrating an example 1300 of uplink tunneling via relays, in accordance with the present disclosure.

As shown in FIG. 13, a source UE may transmit, via groupcast signaling on a PSSCH, uplink data to a first relay UE and a second relay UE. The first relay UE may transmit, via groupcast signaling on a PSSCH, the uplink data to a third, fourth and fifth relay UE. The second relay UE may transmit, via groupcast signaling on a PSSCH, the uplink data to the third, fourth and fifth relay UE. The third relay UE may transmit, via groupcast signaling on a PUSCH, the uplink data to the base station. The fourth relay UE may transmit, via groupcast signaling on a PUSCH, the uplink data to the base station. The fifth relay UE may transmit, via groupcast signaling on a PUSCH, the uplink data to the base station. As a result, the source UE may transmit uplink data to the base station based at least in part on a dedicated uplink tunneling via multiple relay UEs.

As indicated above, FIG. 13 is provided as an example. Other examples may differ from what is described with respect to FIG. 13.

Figure 14:
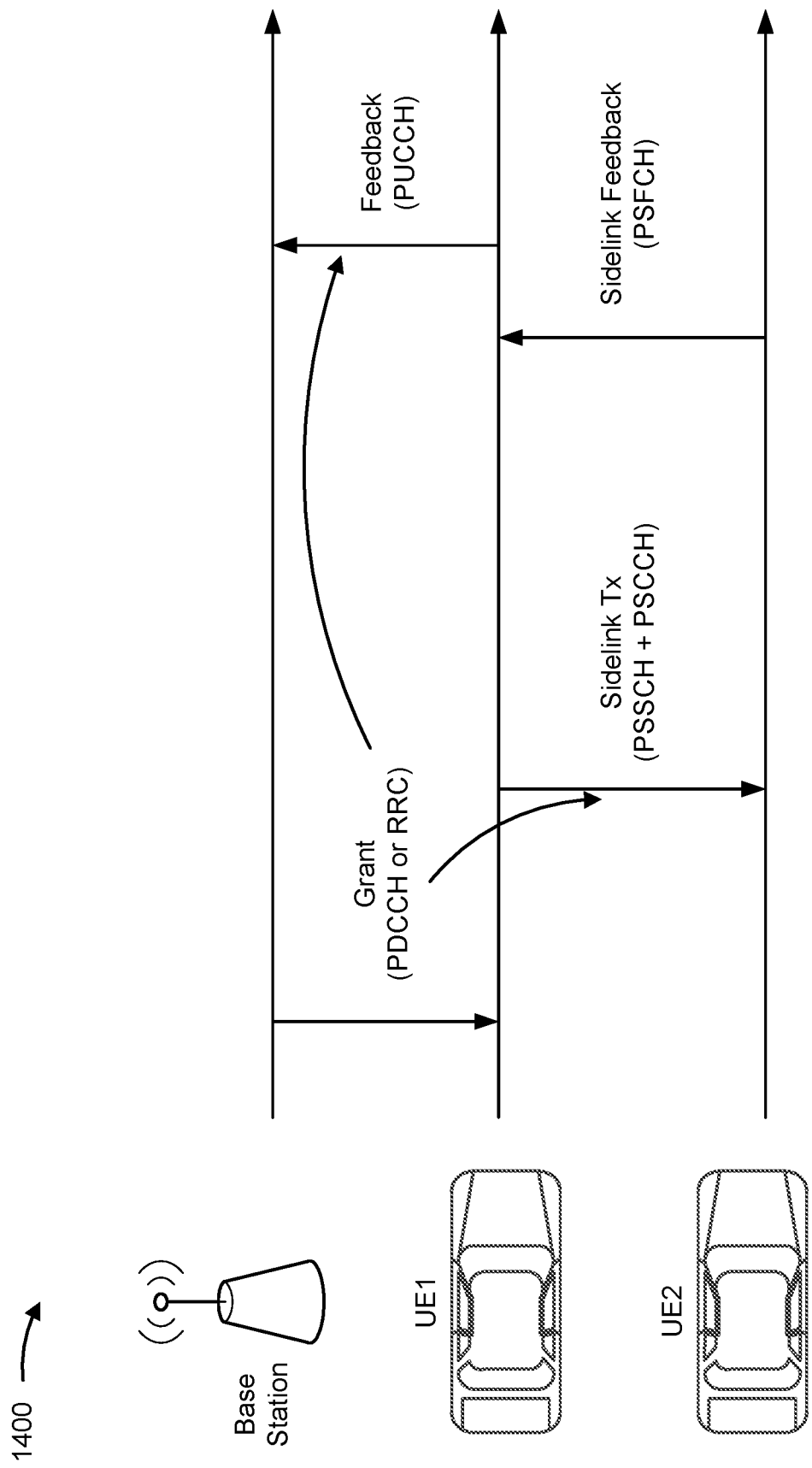
FIG. 14 is a diagram illustrating an example of sidelink communications, in accordance with the present disclosure.

FIG. 14 is a diagram illustrating an example 1400 of sidelink communications, in accordance with the present disclosure.

A base station and one or more UEs may communicate via a PDCCH and a PDSCH in a downlink. The base station and the one or more UEs may communicate via a PUCCH and a PUSCH in an uplink. The UEs may communicate with each other via a PSSCH and a PSCCH for sidelink communications. The UEs may communicate with each other via a PSFCH for sidelink feedback.

As shown in FIG. 14, a base station may transmit a grant to a first UE. The base station may transmit the grant via a PDCCH or via RRC signaling. The first UE may send a sidelink transmission to a second UE based at least in part on the grant received from the base station. The first UE may send the sidelink transmission via a PSCCH and/or a PSSCH. The second UE may transmit sidelink feedback to the first UE based at least in part on the sidelink transmission. The second UE may transmit the sidelink feedback via a PSFCH. The first UE may transmit feedback to the base station via a PUCCH.

As indicated above, FIG. 14 is provided as an example. Other examples may differ from what is described with respect to FIG. 14.

Figure 15:
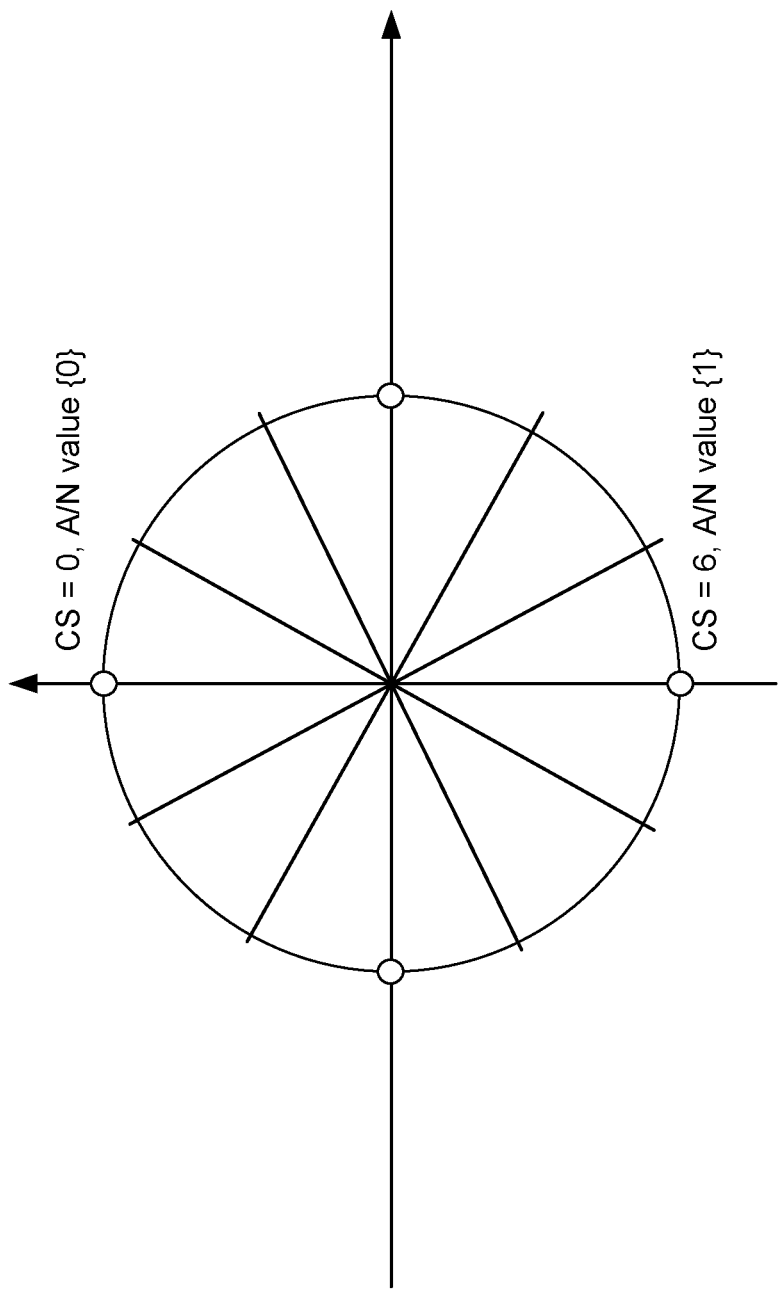
FIG. 15 is a diagram illustrating an example of a mapping between hybrid automatic repeat request acknowledgement (HARQ-ACK) information bit values and cyclic shifts, in accordance with the present disclosure.

FIG. 15 is a diagram illustrating an example 1500 of a mapping between HARQ-ACK information bit values and cyclic shifts, in accordance with the present disclosure.

A PSFCH may carry one-bit HARQ-ACK feedback. For example, the HARQ-ACK feedback may indicate an ACK/NACK value of 0 or an ACK/NACK value of 1. The HARQ-ACK feedback may be associated with an amount of cyclic shift, which may depend on information bits. In a mapping of HARQ-ACK information bit values to a cyclic shift, from a cyclic shift pair, of a sequence for a PSFCH transmission when HARQ-ACK information includes ACK or NACK, a HARQ-ACK value of 0 (NACK) may be mapped to a sequence cyclic shift of 0, and a HARQ-ACK value of 1 (ACK) may be mapped to a sequence cyclic shift of 6. In a mapping of HARQ-ACK information bit values to a cyclic shift, from a cyclic shift pair, of a sequence for a PSFCH transmission when HARQ-ACK information includes only NACK, a HARQ-ACK value of 0 (NACK) may be mapped to a sequence cyclic shift of 0.

As shown in FIG. 15, an ACK/NACK value of 0 may be mapped to a cyclic shift value of 0, and an ACK/NACK value of 1 may be mapped to a cyclic shift value of 1.

Further, cyclic shift values may range from 0 to 11 (12 cyclic shift values in total), and a distance between the cyclic shift value associated with the ACK/NACK value of 0 (the cyclic shift value of 0) and the cyclic shift value associated with the ACK/NACK value of 1 (the cyclic shift value of 6) may be equal to six.

As indicated above, FIG. 15 is provided as an example. Other examples may differ from what is described with respect to FIG. 15.

A receiving UE may determine CSI based at least in part on a PSSCH, and the CSI may be used for a retransmission or a transmission of new data. However, the receiving UE may communicate the CSI in a MAC-CE, which may be a relatively slow mechanism for a transmitting UE to receive the CSI and perform the retransmission or the transmission of new data based at least in part on the CSI.

In various implementations and techniques described herein, the receiving UE may transmit CSI based at least in part on a PSSCH signal, and the receiving UE may transmit the CSI on a PSFCH. The transmission of the CSI via the PSFCH may enable the transmitting UE to receive the CSI in a relatively short time period, as compared to transmitting the CSI in a MAC-CE. Further, in some aspects, the CSI may be transmitted by UEs that serve as relay UEs, which may improve coverage and reliability. For example, CSI feedback from relay UEs may include a CQI/MCS and a redundancy version index, which may represent a starting bit in an encoded bit circular buffer.

In various implementations and techniques described herein, the relay UEs may be used to improve coverage and reliability for PC5 interfaces between sidelink UEs. CSI feedback from relay UEs may increase the decoding relaying set across different hops but may allow additional relay UEs to decode data. Some RVs may have more systematic bits (e.g., original bits) in addition to parity bits, while other RVs may have partial systematic bits or no systematic bits. The RVs with more systematic bits, such as RV0 or RV3, may be self-decodable. In case of strong interference or poor channel quality, using certain RV indices may be beneficial to a receiving UE. As a result, the receiving UE may recommend a transmitting UE to perform a next transmission with a certain RV index, which may improve decoding and reliability.

Figure 16:
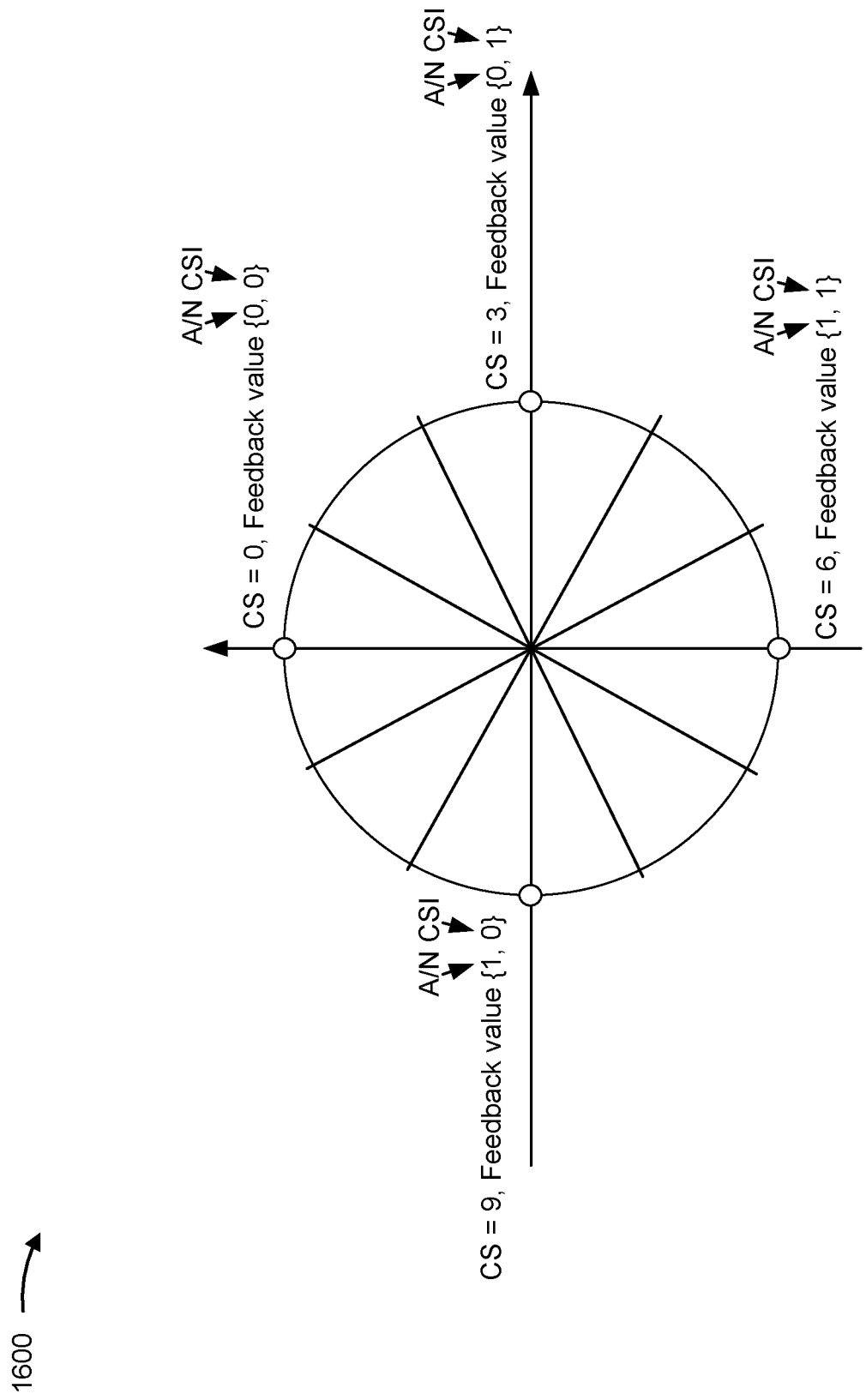
FIGS. 16-22 are diagrams illustrating examples associated with channel state information (CSI) feedback for sidelink communications, in accordance with the present disclosure.

FIG. 16 is a diagram illustrating an example 1600 associated with CSI feedback for sidelink communications, in accordance with the present disclosure.

In some aspects, HARQ-ACK feedback and CSI feedback may be associated with a same PSFCH resource. For example, a PSFCH may carry two bits of HARQ-ACK feedback and CSI feedback in total. The HARQ-ACK feedback may include acknowledgement/negative acknowledgement (A/N) feedback. Further, a mapping of cyclic shift values to feedback values with equal distances may be defined, and an A/N feedback may be associated with a most significant bit (MSB) and CSI feedback may be associated with a least significant bit (LSB).

As shown in FIG. 16, a cyclic shift value of 0 may represent an A/N feedback value of 0 and a CSI feedback value of 0, a cyclic shift value of 3 may represent an A/N feedback value of 0 and a CSI feedback value of 1, a cyclic shift value of 6 may represent an A/N feedback value of 1 and a CSI feedback value of 1, and/or a cyclic shift value of 9 may represent an A/N feedback value of 1 and a CSI feedback value of 0. In this example, an equal distance between cyclic shift values may be used when mapping the cyclic shift values to the feedback values associated with A/N and CSI.

As indicated above, FIG. 16 is provided as an example. Other examples may differ from what is described with respect to FIG. 16.

Figure 17:
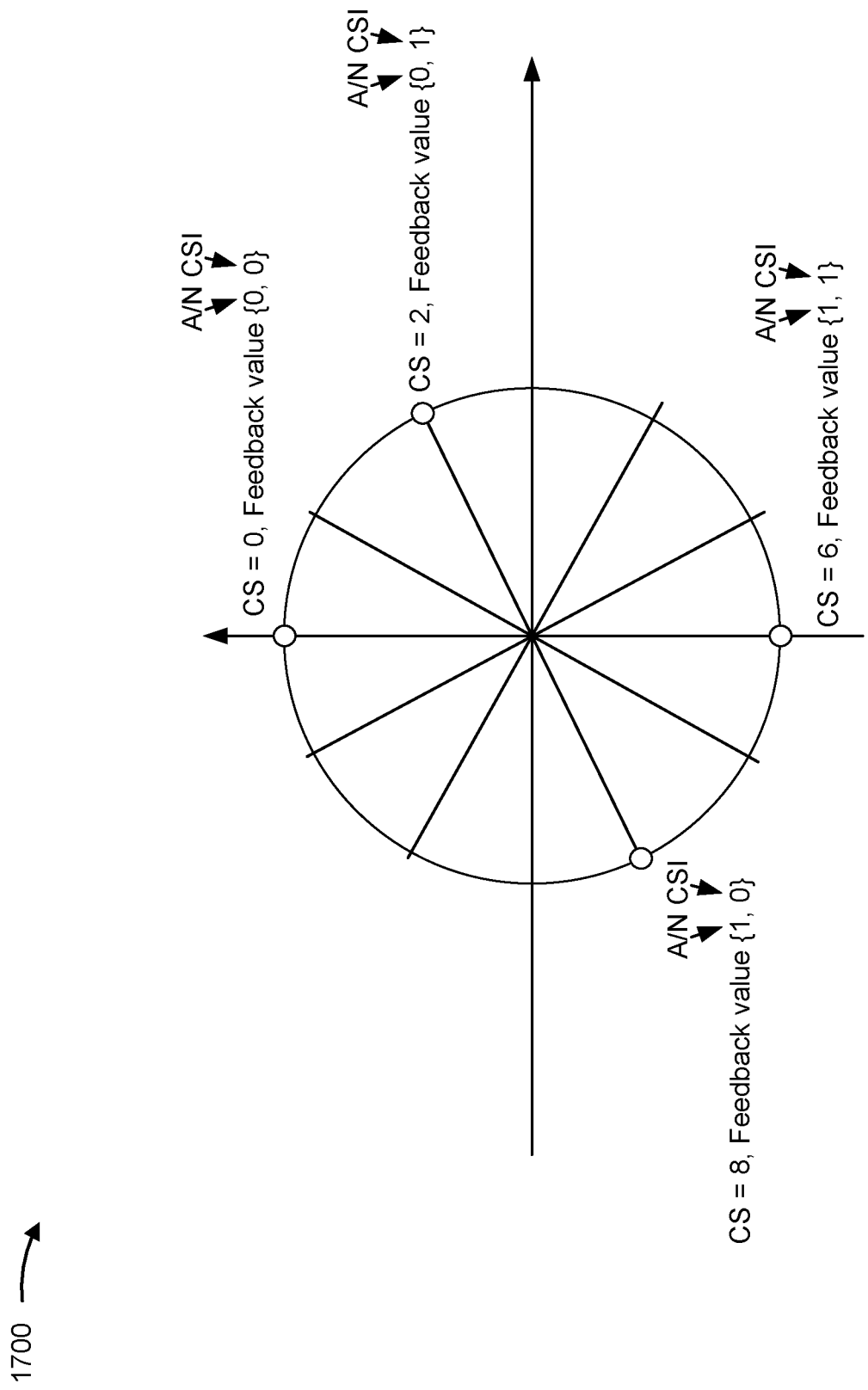

FIG. 17 is a diagram illustrating an example 1700 associated with CSI feedback for sidelink communications, in accordance with the present disclosure.

In some aspects, HARQ-ACK feedback and CSI feedback may be associated with a same PSFCH resource. For example, a PSFCH may carry two bits of HARQ-ACK feedback and CSI feedback in total. The HARQ-ACK feedback may include A/N feedback. The bits indicated in the PSFCH may be associated with different priority levels. For example, the A/N feedback may be associated with a high priority bit, and the CSI feedback may be associated with a low priority bit. Further, a mapping of cyclic shift values to feedback values with unequal distances may be defined, and an A/N feedback may be associated with an MSB and CSI feedback may be associated with an LSB.

As shown in FIG. 17, a cyclic shift value of 0 may represent an A/N feedback value of 0 and a CSI feedback value of 0, a cyclic shift value of 2 may represent an A/N feedback value of 0 and a CSI feedback value of 1, a cyclic shift value of 6 may represent an A/N feedback value of 1 and a CSI feedback value of 1, and/or a cyclic shift value of 8 may represent an A/N feedback value of 1 and a CSI feedback value of 0. In this example, unequal distances between cyclic shift values may be used when mapping the cyclic shift values to the feedback values associated with A/N and CSI.

As indicated above, FIG. 17 is provided as an example. Other examples may differ from what is described with respect to FIG. 17.

Figure 18:
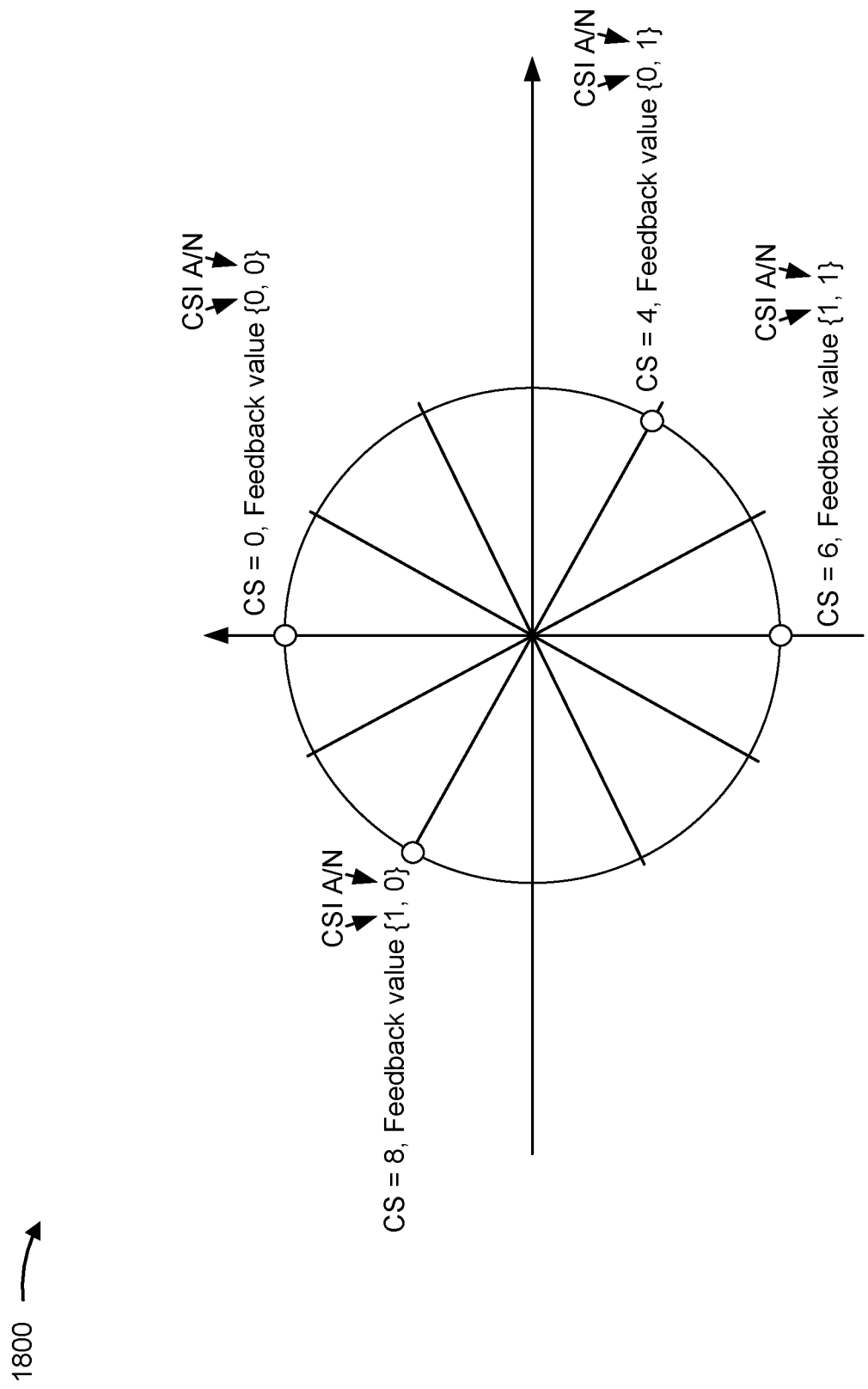

FIG. 18 is a diagram illustrating an example 1800 associated with CSI feedback for sidelink communications, in accordance with the present disclosure.

In some aspects, HARQ-ACK feedback and CSI feedback may be associated with a same PSFCH resource. For example, a PSFCH may carry two bits of HARQ-ACK feedback and CSI feedback in total. The HARQ-ACK feedback may include A/N feedback. The bits indicated in the PSFCH may be associated with different priority levels. For example, the A/N feedback may be associated with a high priority bit, and the CSI feedback may be associated with a low priority bit. Further, a mapping of cyclic shift values to feedback values with unequal distances may be defined, and an A/N feedback may be associated with an LSB and CSI feedback may be associated with an MSB.

As shown in FIG. 18, a cyclic shift value of 0 may represent a CSI feedback value of 0 and an A/N feedback value of 0, a cyclic shift value of 4 may represent a CSI feedback value of 0 and an A/N feedback value of 1, a cyclic shift value of 6 may represent a CSI feedback value of 1 and an A/N feedback value of 1, and/or a cyclic shift value of 10 may represent a CSI feedback value of 1 and an A/N feedback value of 0. In this example, unequal distances between cyclic shift values may be used when mapping the cyclic shift values to the feedback values associated with A/N and CSI.

As indicated above, FIG. 18 is provided as an example. Other examples may differ from what is described with respect to FIG. 18.

Figure 19:
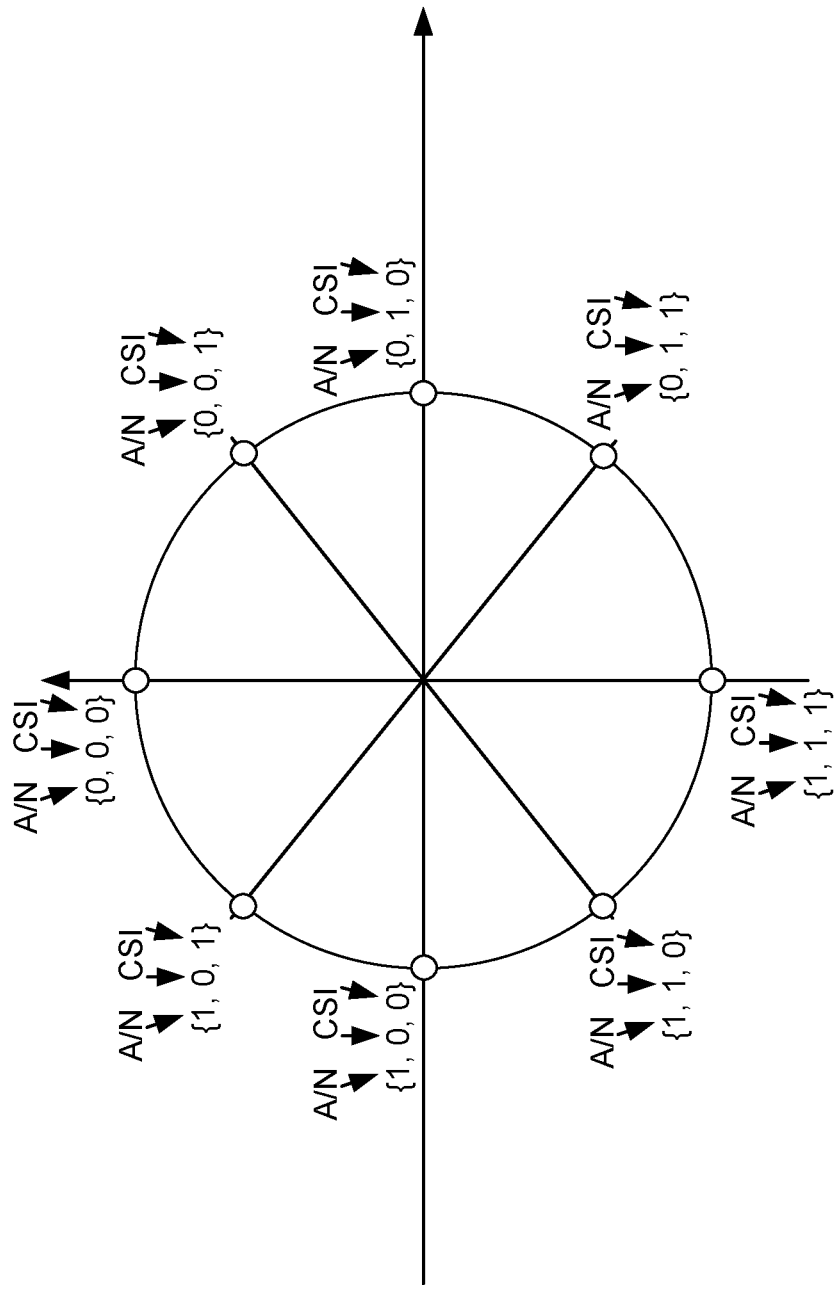

FIG. 19 is a diagram illustrating an example 1900 associated with CSI feedback for sidelink communications, in accordance with the present disclosure.

In some aspects, HARQ-ACK feedback and CSI feedback may be associated with a same PSFCH resource. For example, a PSFCH may carry three bits or four bits of HARQ-ACK feedback and CSI feedback in total. The HARQ-ACK feedback may include A/N feedback. A/N feedback may be associated with an MSB and CSI feedback (e.g., two or three bits of CSI feedback) may be associated with remaining bits. In other words, a first bit may be associated with the A/N feedback, and the remaining two bits or three bits may be associated with the CSI feedback.

As shown in FIG. 19, a first cyclic shift value may represent an A/N feedback value of 0, a first CSI feedback value of 0, and a second CSI feedback value of 0. A second first cyclic shift value may represent an A/N feedback value of 0, a first CSI feedback value of 0, and a second CSI feedback value of 1. A third cyclic shift value may represent an A/N feedback value of 0, a first CSI feedback value of 1, and a second CSI feedback value of 0. A fourth cyclic shift value may represent an A/N feedback value of 0, a first CSI feedback value of 1, and a second CSI feedback value of 1. A fifth cyclic shift value may represent an A/N feedback value of 1, a first CSI feedback value of 1, and a second CSI feedback value of 1. A sixth cyclic shift value may represent an A/N feedback value of 1, a first CSI feedback value of 1, and a second CSI feedback value of 0. A seventh cyclic shift value may represent an A/N feedback value of 1, a first CSI feedback value of 0, and a second CSI feedback value of 0. An eighth cyclic shift value may represent an A/N feedback value of 1, a first CSI feedback value of 0, and a second CSI feedback value of 1.

As indicated above, FIG. 19 is provided as an example. Other examples may differ from what is described with respect to FIG. 19.

In some aspects, CSI including a CQI, an MCS, a rank indicator (RI), and/or an RV index may be transmitted using more than one resource block. Multiple resource blocks or PSFCH resources may be used to transmit the CSI, where each of the PSFCH resources may have a single resource block. In some aspects, a same A/N bit may be transmitted across the multiple resource blocks or PSFCH resources, and different CSI may be transmitted across the multiple resource blocks or PSFCH resources. As a result, an increased amount of CSI may be transmitted, while allowing for increased reliability for the A/N transmission.

As an example, for four resource blocks, encoding may be performed separately on each resource block. A first resource block may be associated with A/N feedback and first CSI feedback, a second resource block may be associated with the A/N feedback and second CSI feedback, a third resource block may be associated with the A/N feedback and third CSI feedback, and a fourth resource block may be associated with the A/N feedback and fourth CSI feedback. In other words, each resource block may include the same A/N bit and one CSI bit from a sequence of a 4-bit CSI. In this example, CSI feedback may be four bits, as the first, second, third, and fourth CSIs may each be one bit.

In some aspects, two or more resources of a PSFCH may be constructed, such that one PSFCH resource may be associated with HARQ-ACK feedback and one or more PSFCH resources may be associated with CSI feedback. The one PSFCH resource for the HARQ-ACK feedback may be transmitted in one resource block. These PSFCH resources may be selected based at least in part on the mapped resources from a PSSCH reception. In some aspects, each resource for the CSI feedback may have one or more bits.

As an example, for four resource blocks, encoding may be performed separately on each resource block. A first resource block may be associated with A/N feedback, a second resource block may be associated with CSI feedback, a third resource block may be associated with CSI feedback, and a fourth resource block may be associated with CSI feedback. The CSI feedback associated with the second, third, and fourth resource blocks may correspond to a sequence of a 4-bit CSI. In other words, CSI from a sequence of 4-bit CSI may be transmitted on the three remaining resource blocks. Each resource block of PSFCH may have the four bits with separate encoding. Alternatively, joint encoding may be used across the three remaining resource blocks for the CSI feedback, where the four bits may be encoded using a long sequence. As a result, a long sequence having a size of three resource blocks may be generated to encode the 4-bit CSI.

In some aspects, a NACK-only feedback period may be configured. For example, a configuration may be transmitted to a UE to enable the UE to provide NACK-only decoding feedback. CSI feedback may be configured to be transmitted with NACK-only events. For NACK-only feedback, and when CSI feedback is needed on NACK-only cases, a NACK bit may not be transmitted. Rather, the bit may be used for transmitting CSI feedback instead. In other words, for NACK-only feedback, one bit for NACK may not be transmitted, and the one bit may instead be used to transmit the CSI feedback. Further, additional resources may be used to transmit the CSI feedback when the CSI feedback includes more than one bit of information. A power level associated with the CSI feedback may indicate that there was a NACK transmission. In other words, the power level associated with the CSI feedback may likely not satisfy a threshold, which may implicitly indicate the NACK transmission.

In some aspects, an ACK-only feedback period may be configured. The CSI feedback may be configured to be transmitted with ACK-only events. For ACK-only feedback, an ACK bit may not be transmitted. Rather, the bit may be used for transmitting CSI feedback instead.

In some aspects, the CSI feedback may be based at least in part on the PSSCH, and the CSI feedback may indicate a DMRS RSRP, a CQI/MCS based at least in part on a received data signal, an RV index (e.g., a best RV index in relation to other RV indices) for a retransmission, and/or a data rank (e.g., a best data rank in relation to other data ranks). Since the CSI feedback may include one or more bits, quantization levels of parameters may be signaled using RRC signaling and/or a MAC-CE.

Figure 20:
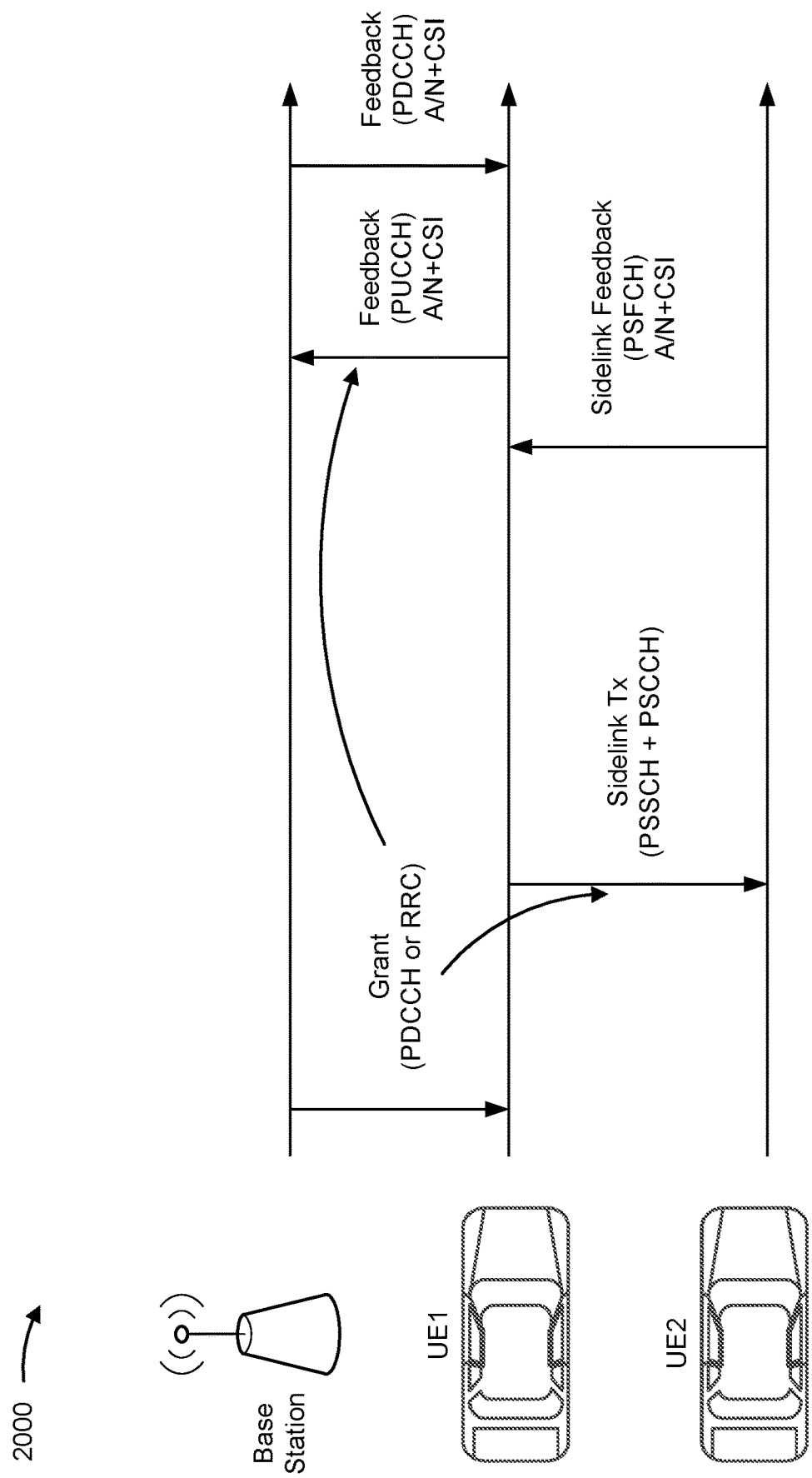

As an example, when only MCS/CQI is signaled as CSI feedback and one bit is used for the CSI feedback, a first bit value (e.g., 0) may indicate to backoff from a current CQI/MCS by a first value, and a second bit value (e.g., 1) may indicate to backoff from the current MCS/CQI by a second value, where the first value and the second value may be signaled in RRC or MAC-CE beforehand FIG. 20 is a diagram illustrating an example 2000 associated with CSI feedback for sidelink communications, in accordance with the present disclosure.

As shown in FIG. 20, a base station may transmit a grant to a first UE. The base station may transmit the grant via a PDCCH or via RRC signaling. The first UE may send a sidelink transmission to a second UE based at least in part on the grant received from the base station. The first UE may send the sidelink transmission via a PSCCH and/or a PSSCH. The second UE may transmit sidelink feedback to the first UE based at least in part on the sidelink transmission. The second UE may transmit the sidelink feedback via a PSFCH. The sidelink feedback may include A/N feedback and CSI feedback based at least in part on the sidelink transmission. The first UE may transmit feedback to the base station via a PUCCH. The feedback may include A/N feedback and CSI feedback. Further, the base station may transmit feedback to the first UE via a PDCCH. The feedback may include A/N feedback and CSI feedback.

As indicated above, FIG. 20 is provided as an example. Other examples may differ from what is described with respect to FIG. 20.

Figure 21:
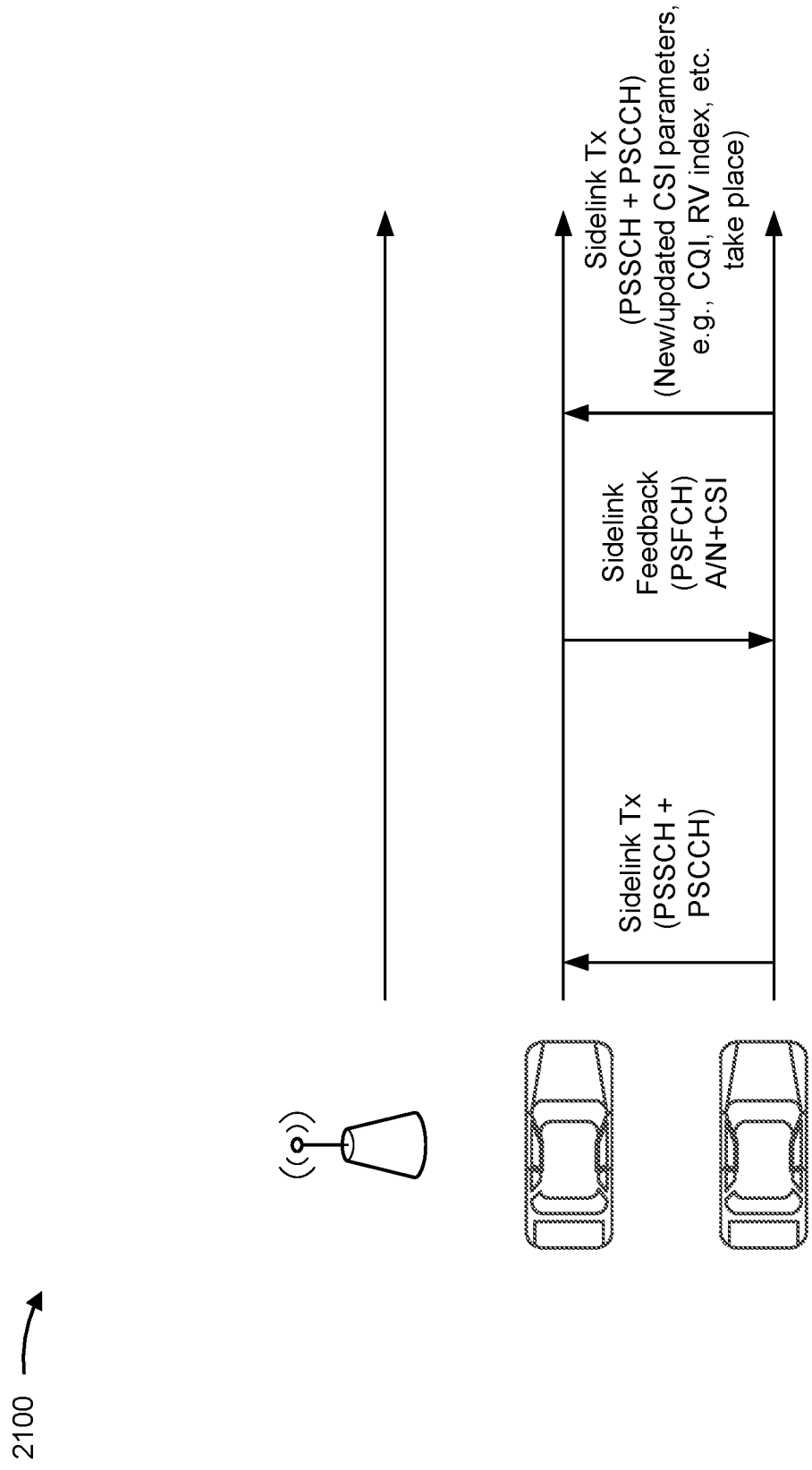

FIG. 21 is a diagram illustrating an example 2100 associated with CSI feedback for sidelink communications, in accordance with the present disclosure.

As shown in FIG. 21, a source UE may send a first sidelink transmission to a relay UE. The source UE may be one hop from the relay UE. The source UE may send the first sidelink transmission via a PSCCH and/or a PSSCH. The relay UE may transmit sidelink feedback to the source UE based at least in part on the first sidelink transmission. The relay UE may transmit the sidelink feedback via a PSFCH. The sidelink feedback may include A/N feedback and CSI feedback based at least in part on the sidelink transmission. The CSI feedback may include various CSI parameters, such as a DMRS RSRP, a CQI/MCS based at least in part on a received data signal, an RV index, and/or a data rank. In other words, the CSI feedback may indicate new/updated CSI and/or transmission parameters. The source UE may send a second sidelink transmission to the relay UE via the PSCCH and/or the PSSCH. The relay UE may send the second sidelink transmission based at least in part on the CSI parameters, as previously indicated to the relay UE from the source UE.

In some aspects, when the A/N feedback includes an ACK, the ACK may not be associated with CSI feedback. When the A/N feedback includes a NACK, the CSI feedback may be transmitted. In some aspects, an ACK may be associated with CSI feedback for upcoming packet relaying.

As indicated above, FIG. 21 is provided as an example. Other examples may differ from what is described with respect to FIG. 21.

In some aspects, a base station may transmit, via a PDCCH over a Uu link, feedback regarding an RV index. The RV index may be a best next RV index, which may be used by a next relay UE or a set of relay UEs. In some aspects, the RV index may be used in a next transmission when only one relay UE is transmitting at a time. In some aspects, when multiple relay UEs are transmitting at a same time and using a same resource to the base station, the multiple UEs may all use a same RV index. The relay UEs may perform the transmission using a suggested RV index from the base station. In some aspects, when each relay UE transmits separately, the base station may inform each relay UE of a best RV index to use.

Figure 22:
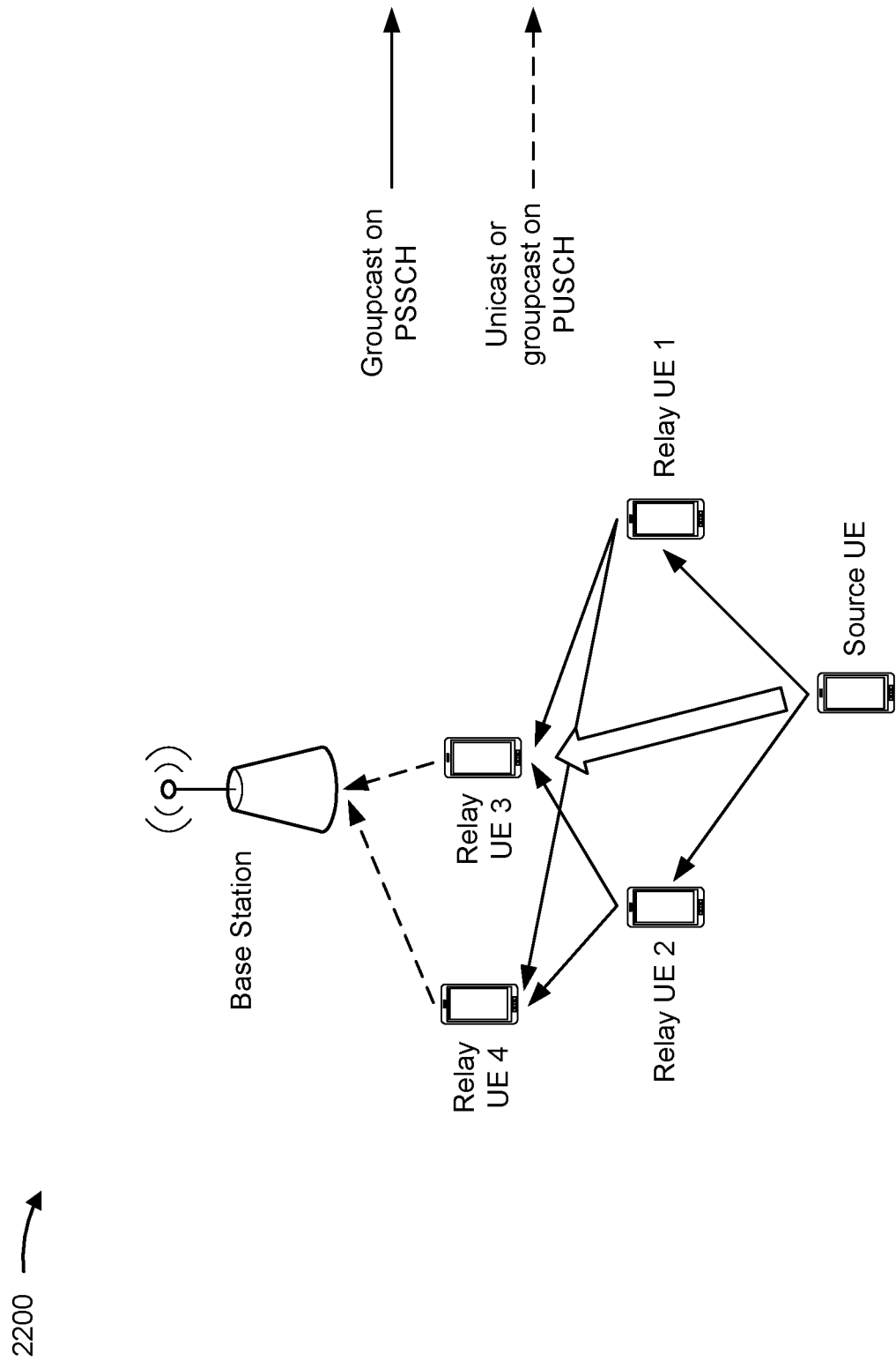

FIG. 22 is a diagram illustrating an example 2200 associated with CSI feedback for sidelink communications, in accordance with the present disclosure.

As shown in FIG. 22, a source UE may transmit, via groupcast signaling on a PSSCH, uplink data to a first relay UE and a second relay UE. The first relay UE may transmit, via groupcast signaling on a PSSCH, the uplink data to a third relay UE and a fourth relay UE. The second relay UE may transmit, via groupcast signaling on a PSSCH, the uplink data to the third relay UE and the fourth relay UE. The third relay UE may transmit, via groupcast signaling on a PUSCH, the uplink data to the base station. The fourth relay UE may transmit, via groupcast signaling on a PUSCH, the uplink data to the base station.

In some aspects, a relay UE may overhear transmitted information across hops. For example, the relay UE may be a next transmitting relay UE, and the relay UE may transmit an indication, to a current relay UE, of a best RV index for the current relay UE to use. The next transmitting relay UE may transmit the indication based at least in part on the next transmitting relay UE receiving at least one sidelink communication.

As further shown in FIG. 22, as an example, the third relay UE may overhear the source UE, the first relay UE, and the second relay UE, even though the source UE, the first relay UE, and/or the second relay UE may be multiple hops away from the third relay UE. In this case, the third relay UE may transmit an indication of a best RV index for the third relay UE for a next sidelink transmission, based at least at least in part on a transmitting node (e.g., the source UE, the first relay UE, or the second relay UE). In some aspects, the first relay UE and/or the second relay UE may decode a PSFCH associated with the third relay UE to obtain the best RV index for the third relay UE. The first relay UE and/or the second relay UE may send a sidelink transmission to the third relay UE based at least in part on the best RV index for the third relay UE. In some aspects, the first relay UE and/or the second relay UE may perform a groupcast transmission to the third relay UE and the fourth relay UE based at least in part on the best RV index for the third relay UE.

As indicated above, FIG. 22 is provided as an example. Other examples may differ from what is described with respect to FIG. 22.

In some aspects, a transmitting UE may transmit data in a multicast manner. Since different relay UEs may transmit different indications of best RV indexes, the transmitting UE of a hop may determine a best CSI (e.g., RV index, MCS, etc.) based at least in part on an aggregation of CSI feedback from different relay UEs. The transmitting UE may transmit, in SCI via a PSSCH, aggregated CSI feedback information associated with a transmission.

In some aspects, a transmitting UE may transmit data in a unicast manner. In this case, the transmitting UE may transmit, to a receiving UE, a transport block with a suggested CSI (e.g., RV index, MCS, etc.) of that receiving UE.

Figure 23:
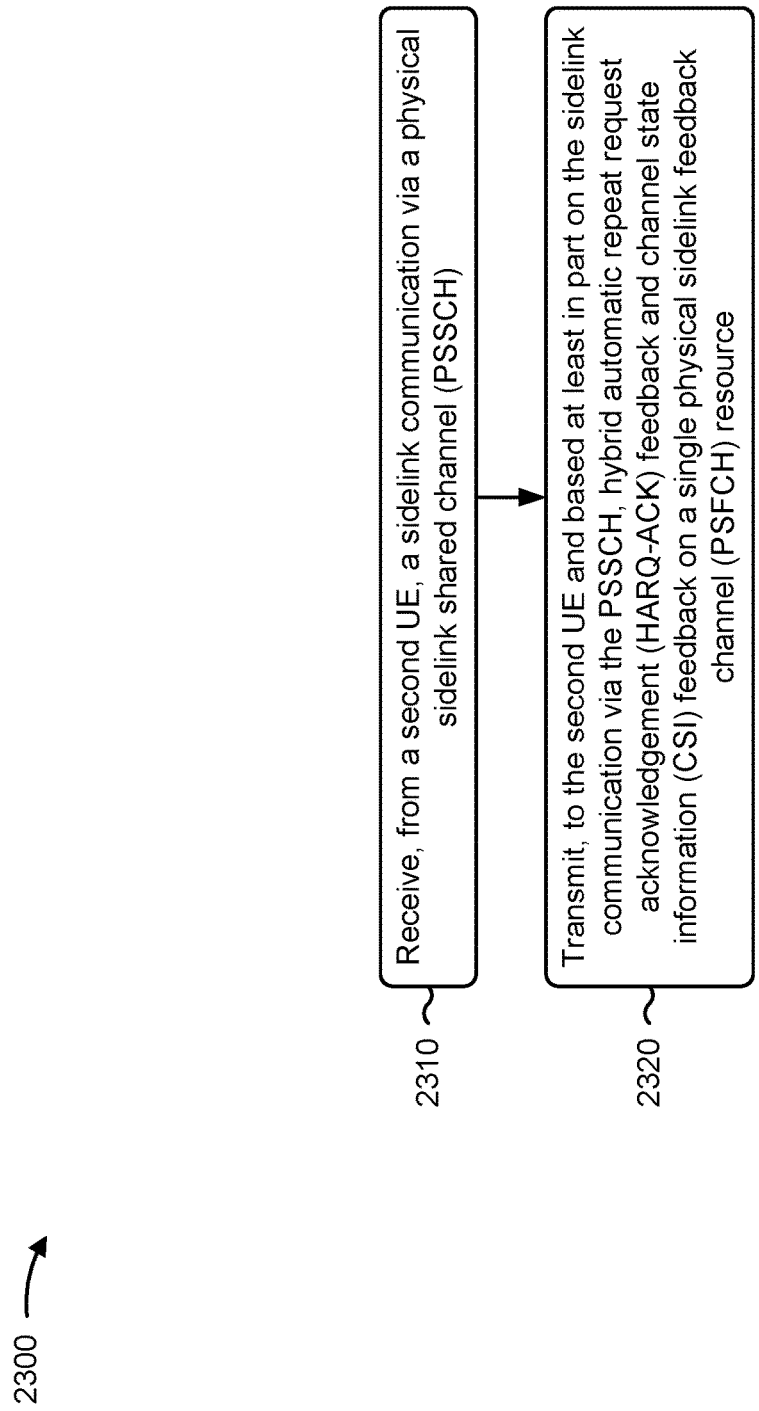
FIGS. 23-24 are diagrams illustrating example processes associated with CSI feedback for sidelink communications, in accordance with the present disclosure.

FIG. 23 is a diagram illustrating an example process 2300 performed, for example, by a first UE, in accordance with the present disclosure. Example process 2300 is an example where the first UE (e.g., UE 120a) performs operations associated with techniques for channel state information feedback for sidelink communications.

As shown in FIG. 23, in some aspects, process 2300 may include receiving, from a second UE, a sidelink communication via a PSSCH (block 2310). For example, the UE (e.g., using reception component 2502, depicted in FIG. 25) may receive, from a second UE, a sidelink communication via a PSSCH, as described above.

As further shown in FIG. 23, in some aspects, process 2300 may include transmitting, to the second UE and based at least in part on the sidelink communication via the PSSCH, HARQ-ACK feedback and CSI feedback on a single PSFCH resource (block 2320). For example, the UE (e.g., using transmission component 2504, depicted in FIG. 25) may transmit, to the second UE and based at least in part on the sidelink communication via the PSSCH, HARQ-ACK feedback and CSI feedback on a single PSFCH resource, as described above.

Process 2300 may include additional aspects, such as any single aspect or any combination of aspects described below and/or in connection with one or more other processes described elsewhere herein.

In a first aspect, process 2300 includes selecting a cyclic shift value for transmitting the HARQ-ACK feedback and the CSI feedback based at least in part on a bit value associated with the HARQ-ACK feedback and a bit value associated with the CSI feedback.

In a second aspect, alone or in combination with the first aspect, the selection of the cyclic shift value is from a group of cyclic shift values associated with equal distances between other cyclic shift values in the group.

In a third aspect, alone or in combination with one or more of the first and second aspects, the selection of the cyclic shift value is from a group of cyclic shift values associated with unequal distances between other cyclic shift values in the group.

In a fourth aspect, alone or in combination with one or more of the first through third aspects, the HARQ-ACK feedback is associated with a first bit and the CSI feedback is associated with a second bit.

In a fifth aspect, alone or in combination with one or more of the first through fourth aspects, the first bit is associated with a first priority level and the second bit is associated with a second priority level.

In a sixth aspect, alone or in combination with one or more of the first through fifth aspects, the first bit is associated with a most significant bit and the second bit is associated with a least significant bit.

In a seventh aspect, alone or in combination with one or more of the first through sixth aspects, the first bit is associated with a least significant bit and the second bit is associated with a most significant bit.

In an eighth aspect, alone or in combination with one or more of the first through seventh aspects, the HARQ-ACK feedback is associated with a first bit and the CSI feedback is associated with two or more bits.

In a ninth aspect, alone or in combination with one or more of the first through eighth aspects, the transmission of the CSI feedback uses two or more PSFCH resources, wherein a same HARQ-ACK feedback is associated with each of the two or more PSFCH resources, and wherein different CSI feedbacks are associated with each of the two or more PSFCH resources.

In a tenth aspect, alone or in combination with one or more of the first through ninth aspects, the transmission of the HARQ-ACK feedback and the CSI feedback uses two or more PSFCH resources, wherein a first subset of the two or more PSFCH resources is associated with the HARQ-ACK feedback and a second subset of the two or more PSFCH resources are associated with the CSI feedback.

In an eleventh aspect, alone or in combination with one or more of the first through tenth aspects, process 2300 includes transmitting additional CSI feedback in place of the HARQ-ACK feedback based at least in part on a NACK-only decoding feedback configuration associated with the first UE, wherein a NACK bit is repurposed to convey the additional CSI feedback.

In a twelfth aspect, alone or in combination with one or more of the first through eleventh aspects, the CSI indicates one or more of a demodulation reference signal received power, a channel quality indicator or a modulation and coding scheme based at least in part on the sidelink communication received from the second UE, a redundancy version index for a retransmission of the sidelink communication, or a data rank.

In a thirteenth aspect, alone or in combination with one or more of the first through twelfth aspects, process 2300 includes receiving, from a base station via radio resource control signaling or via a MAC-CE, an indication of quantization levels of parameters associated with the CSI feedback.

In a fourteenth aspect, alone or in combination with one or more of the first through thirteenth aspects, the first UE is a source UE and the second UE is a relay UE.

In a fifteenth aspect, alone or in combination with one or more of the first through fourteenth aspects, the first UE is a relay UE and the second UE is a source UE.

In a sixteenth aspect, alone or in combination with one or more of the first through fifteenth aspects, the sidelink communication is a first sidelink communication, and further comprising receiving, from the second UE, a second sidelink communication based at least in part on the HARQ-ACK feedback and the CSI feedback.

In a seventeenth aspect, alone or in combination with one or more of the first through sixteenth aspects, process 2300 includes receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE, and performing the subsequent transmission to the base station based at least in part on the redundancy version index.

In an eighteenth aspect, alone or in combination with one or more of the first through seventeenth aspects, process 2300 includes transmitting, to the second UE, an indication of a redundancy version for the second UE to apply when the second UE is performing the sidelink communication with the first UE, and wherein receiving the sidelink communication comprises receiving the sidelink communication based at least in part on the redundancy version.

In a nineteenth aspect, alone or in combination with one or more of the first through eighteenth aspects, process 2300 includes transmitting, to the second UE, an indication of a redundancy version for the second UE to apply when the second UE is performing the sidelink communication with the first UE, and wherein receiving the sidelink communication comprises receiving the sidelink communication via a groupcast communication based at least in part on the redundancy version.

In a twentieth aspect, alone or in combination with one or more of the first through nineteenth aspects, process 2300 includes determining aggregated feedback information for a plurality of UEs, wherein the aggregated feedback information indicates CSI for the plurality of UEs, and performing a multicast transmission to the plurality of UEs based at least in part on the aggregated feedback information.

Although FIG. 23 shows example blocks of process 2300, in some aspects, process 2300 may include additional blocks, fewer blocks, different blocks, or differently arranged blocks than those depicted in FIG. 23. Additionally, or alternatively, two or more of the blocks of process 2300 may be performed in parallel.

Figure 24:
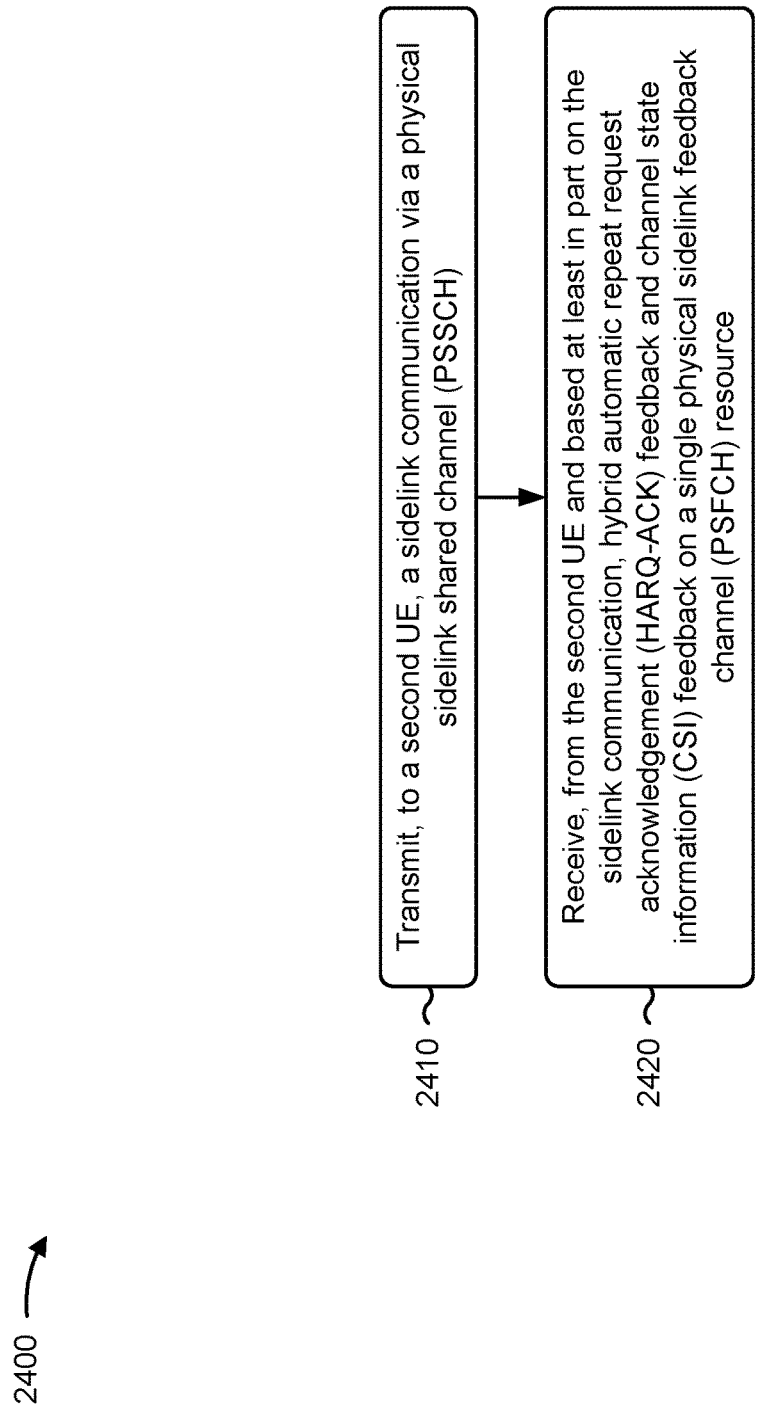

FIG. 24 is a diagram illustrating an example process 2400 performed, for example, by a first UE, in accordance with the present disclosure. Example process 2400 is an example where the first UE (e.g., UE 120*a*) performs operations associated with techniques for channel state information feedback for sidelink communications.

As shown in FIG. 24, in some aspects, process 2400 may include transmitting, to a second UE, a sidelink communication via a PSSCH (block 2410). For example, the UE (e.g., using transmission component 2504, depicted in FIG. 25) may transmit, to a second UE, a sidelink communication via a PSSCH, as described above.

As further shown in FIG. 24, in some aspects, process 2400 may include receiving, from the second UE and based at least in part on the sidelink communication, HARQ-ACK feedback and CSI feedback on a single PSFCH resource (block 2420). For example, the UE (e.g., using reception component 2502, depicted in FIG. 25) may receive, from the second UE and based at least in part on the sidelink communication, HARQ-ACK feedback and CSI feedback on a single PSFCH resource, as described above.

Process 2400 may include additional aspects, such as any single aspect or any combination of aspects described below and/or in connection with one or more other processes described elsewhere herein.

In a first aspect, process 2400 includes the first UE is a source UE and the second UE is a relay UE, or the first UE is a relay UE and the second UE is a source UE.

In a second aspect, alone or in combination with the first aspect, the sidelink communication is a first sidelink communication, and further comprising transmitting, to the second UE, a second sidelink communication based at least in part on the HARQ-ACK feedback and the CSI feedback.

In a third aspect, alone or in combination with one or more of the first and second aspects, process 2400 includes receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE, and performing the subsequent transmission to the base station based at least in part on the redundancy version index.

In a fourth aspect, alone or in combination with one or more of the first through third aspects, process 2400 includes receiving, from the second UE, an indication of a redundancy version for the first UE to apply when performing the sidelink communication with the second UE, and wherein transmitting the sidelink communication comprises transmitting the sidelink communication based at least in part on the redundancy version.

In a fifth aspect, alone or in combination with one or more of the first through fourth aspects, process 2400 includes receiving, from the second UE, an indication of a redundancy version for the first UE to apply when performing the sidelink communication with the second UE, and wherein transmitting the sidelink communication comprises transmitting the sidelink communication via a groupcast communication based at least in part on the redundancy version.

In a sixth aspect, alone or in combination with one or more of the first through fifth aspects, process 2400 includes determining aggregated feedback information for a plurality of UEs, wherein the aggregated feedback information indicates CSI for the plurality of UEs, and performing a multicast transmission to the plurality of UEs based at least in part on the aggregated feedback information.

Although FIG. 24 shows example blocks of process 2400, in some aspects, process 2400 may include additional blocks, fewer blocks, different blocks, or differently arranged blocks than those depicted in FIG. 24. Additionally, or alternatively, two or more of the blocks of process 2400 may be performed in parallel.

Figure 25:
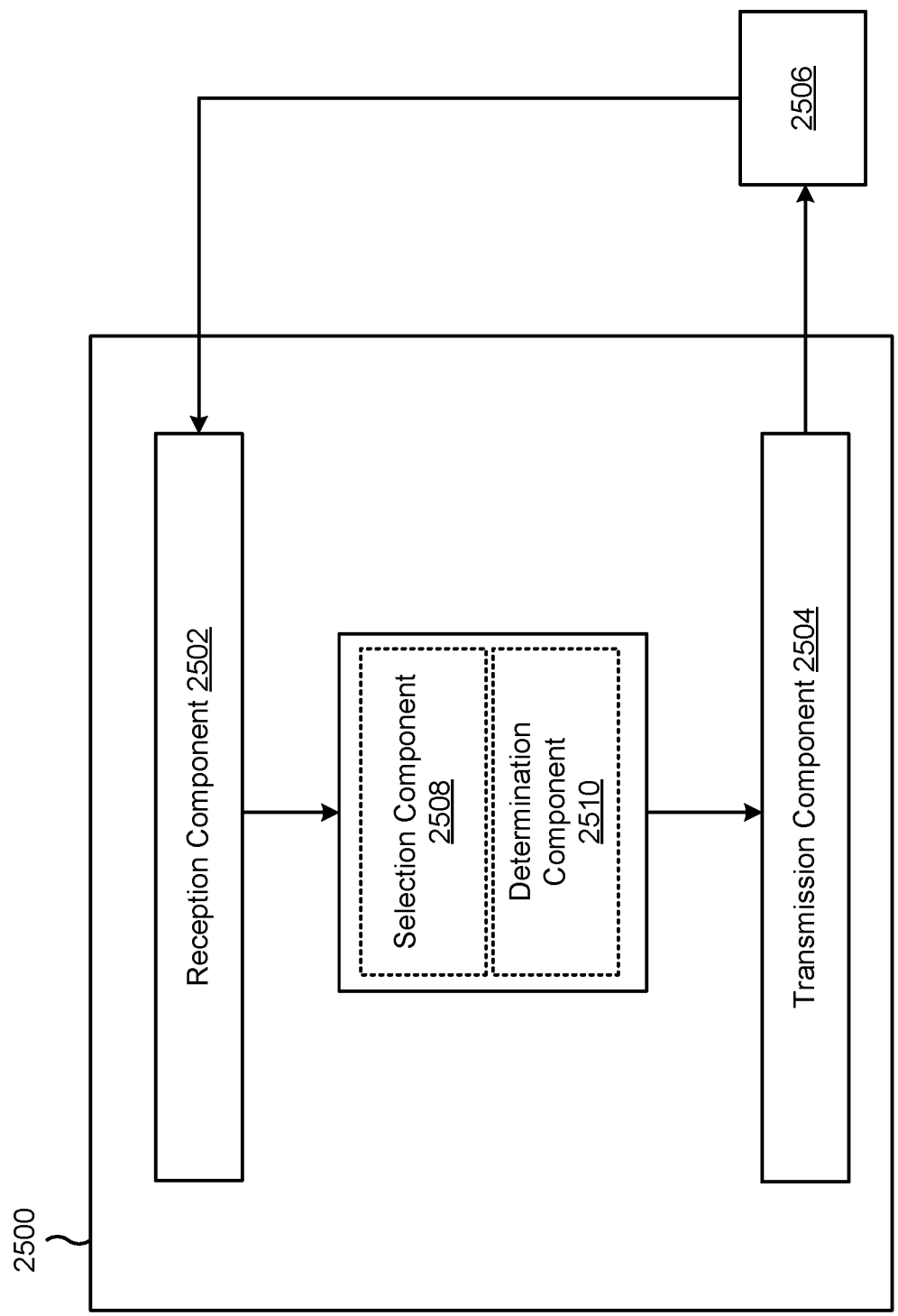
FIG. 25 is a block diagram of an example apparatus for wireless communication, in accordance with the present disclosure.

FIG. 25 is a block diagram of an example apparatus 2500 for wireless communication. The apparatus 2500 may be a first UE, or a first UE may include the apparatus 2500. In some aspects, the apparatus 2500 includes a reception component 2502 and a transmission component 2504, which may be in communication with one another (for example, via one or more buses and/or one or more other components). As shown, the apparatus 2500 may communicate with another apparatus 2506 (such as a UE, a base station, or another wireless communication device) using the reception component 2502 and the transmission component 2504. As further shown, the apparatus 2500 may include one or more of a selection component 2508, or a determination component 2510, among other examples.

In some aspects, the apparatus 2500 may be configured to perform one or more operations described herein in connection with FIGS. 16-22. Additionally, or alternatively, the apparatus 2500 may be configured to perform one or more processes described herein, such as process 2300 of FIG. 23, process 2400 of FIG. 24, or a combination thereof. In some aspects, the apparatus 2500 and/or one or more components shown in FIG. 25 may include one or more components of the first UE described above in connection with FIG. 2. Additionally, or alternatively, one or more components shown in FIG. 25 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2502 may receive communications, such as reference signals, control information, data communications, or a combination thereof, from the apparatus 2506. The reception component 2502 may provide received communications to one or more other components of the apparatus 2500. In some aspects, the reception component 2502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2506. In some aspects, the reception component 2502 may include one or more antennas, a demodulator, a MIMO detector, a receive processor, a controller/processor, a memory, or a combination thereof, of the first UE described above in connection with FIG. 2.

The transmission component 2504 may transmit communications, such as reference signals, control information, data communications, or a combination thereof, to the apparatus 2506. In some aspects, one or more other components of the apparatus 2506 may generate communications and may provide the generated communications to the transmission component 2504 for transmission to the apparatus 2506. In some aspects, the transmission component 2504 may perform signal processing on the generated communications (such as filtering, amplification, modulation, digital-to-analog conversion, multiplexing, interleaving, mapping, or encoding, among other examples), and may transmit the processed signals to the apparatus 2506. In some aspects, the transmission component 2504 may include one or more antennas, a modulator, a transmit MIMO processor, a transmit processor, a controller/processor, a memory, or a combination thereof, of the first UE described above in connection with FIG. 2. In some aspects, the transmission component 2504 may be co-located with the reception component 2502 in a transceiver.

The reception component 2502 may receive, from a second UE, a sidelink communication via a PSSCH. The transmission component 2504 may transmit, to the second UE and based at least in part on the sidelink communication via the PSSCH, HARQ-ACK feedback and CSI feedback on a single PSFCH resource.

The selection component 2508 may select a cyclic shift value for transmitting the HARQ-ACK feedback and the CSI feedback based at least in part on a bit value associated with the HARQ-ACK feedback and a bit value associated with the CSI feedback.

The transmission component 2504 may transmit additional CSI feedback in place of the HARQ-ACK feedback based at least in part on a NACK-only decoding feedback configuration associated with the first UE, wherein a NACK bit is repurposed to convey the additional CSI feedback. The reception component 2502 may receive, from a base station via radio resource control signaling or via a MAC-CE, an indication of quantization levels of parameters associated with the CSI feedback. The reception component 2502 may receive, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE.

The transmission component 2504 may perform the subsequent transmission to the base station based at least in part on the redundancy version index. The transmission component 2504 may transmit, to the second UE, an indication of a redundancy version for the second UE to apply when the second UE is performing the sidelink communication with the first UE. The transmission component 2504 may transmit, to the second UE, an indication of a redundancy version for the second UE to apply when the second UE is performing the sidelink communication with the first UE.

The determination component 2510 may determine aggregated feedback information for a plurality of UEs, wherein the aggregated feedback information indicates CSI for the plurality of UEs. The transmission component 2504 may perform a multicast transmission to the plurality of UEs based at least in part on the aggregated feedback information.

The transmission component 2504 may transmit, to a second UE, a sidelink communication via a PSSCH. The reception component 2502 may receive, from the second UE and based at least in part on the sidelink communication, HARQ-ACK feedback and CSI feedback on a single PSFCH resource.

The reception component 2502 may receive, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE.

The transmission component 2504 may perform the subsequent transmission to the base station based at least in part on the redundancy version index. The reception component 2502 may receive, from the second UE, an indication of a redundancy version for the first UE to apply when performing the sidelink communication with the second UE. The reception component 2502 may receive, from the second UE, an indication of a redundancy version for the first UE to apply when performing the sidelink communication with the second UE.

The determination component 2510 may determine aggregated feedback information for a plurality of UEs, wherein the aggregated feedback information indicates CSI for the plurality of UEs. The transmission component 2504 may perform a multicast transmission to the plurality of UEs based at least in part on the aggregated feedback information.

The number and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally, or alternatively, a set of (one or more) components shown in FIG. 25 may perform one or more functions described as being performed by another set of components shown in FIG. 25.

The following provides an overview of some Aspects of the present disclosure:

Aspect 1: A method of wireless communication performed by a first user equipment (UE), comprising: receiving, from a second UE, a sidelink communication via a physical sidelink shared channel (PSSCH); and transmitting, to the second UE and based at least in part on the sidelink communication via the PSSCH, hybrid automatic repeat request acknowledgement (HARQ-ACK) feedback and channel state information (CSI) feedback on a single physical sidelink feedback channel (PSFCH) resource.

Aspect 2: The method of Aspect 1, further comprising: selecting a cyclic shift value for transmitting the HARQ-ACK feedback and the CSI feedback based at least in part on a bit value associated with the HARQ-ACK feedback and a bit value associated with the CSI feedback.

Aspect 3: The method of Aspect 2, wherein the selection of the cyclic shift value is from a group of cyclic shift values associated with equal distances between other cyclic shift values in the group.

Aspect 4: The method of Aspect 2, wherein the selection of the cyclic shift value is from a group of cyclic shift values associated with unequal distances between other cyclic shift values in the group.

Aspect 5: The method of any of Aspects 1 through 4, wherein the HARQ-ACK feedback is associated with a first bit and the CSI feedback is associated with a second bit.

Aspect 6: The method of Aspect 5, wherein the first bit is associated with a first priority level and the second bit is associated with a second priority level.

Aspect 7: The method of Aspect 5, wherein the first bit is associated with a most significant bit and the second bit is associated with a least significant bit.

Aspect 8: The method of Aspect 5, wherein the first bit is associated with a least significant bit and the second bit is associated with a most significant bit.

Aspect 9: The method of any of Aspects 1 through 8, wherein the HARQ-ACK feedback is associated with a first bit and the CSI feedback is associated with two or more bits.

Aspect 10: The method of any of Aspects 1 through 9, wherein the transmission of the CSI feedback uses two or more PSFCH resources, wherein a same HARQ-ACK feedback is associated with each of the two or more PSFCH resources, and wherein different CSI feedbacks are associated with each of the two or more PSFCH resources.

Aspect 11: The method of any of Aspects 1 through 10, wherein the transmission of the HARQ-ACK feedback and the CSI feedback uses two or more PSFCH resources, wherein a first subset of the two or more PSFCH resources is associated with the HARQ-ACK feedback and a second subset of the two or more PSFCH resources are associated with the CSI feedback.

Aspect 12: The method of any of Aspects 1 through 11, further comprising: transmitting additional CSI feedback in place of the HARQ-ACK feedback based at least in part on a negative acknowledgement (NACK)-only decoding feedback configuration associated with the first UE, wherein a NACK bit is repurposed to convey the additional CSI feedback.

Aspect 13: The method of any of Aspects 1 through 12, wherein the CSI indicates one or more of: a demodulation reference signal received power, a channel quality indicator or a modulation and coding scheme based at least in part on the sidelink communication received from the second UE, a redundancy version index for a retransmission of the sidelink communication, or a data rank.

Aspect 14: The method of any of Aspects 1 through 13, further comprising: receiving, from a base station via radio resource control signaling or via a medium access control control element, an indication of quantization levels of parameters associated with the CSI feedback.

Aspect 15: The method of any of Aspects 1 through 14, wherein the first UE is a source UE and the second UE is a relay UE.

Aspect 16: The method of any of Aspects 1 through 15, wherein the first UE is a relay UE and the second UE is a source UE.

Aspect 17: The method of any of Aspects 1 through 16, wherein the sidelink communication is a first sidelink communication, and further comprising: receiving, from the second UE, a second sidelink communication based at least in part on the HARQ-ACK feedback and the CSI feedback.

Aspect 18: The method of any of Aspects 1 through 17, further comprising: receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and performing the subsequent transmission to the base station based at least in part on the redundancy version index.

Aspect 19: The method of any of Aspects 1 through 18, further comprising: transmitting, to the second UE, an indication of a redundancy version for the second UE to apply when the second UE is performing the sidelink communication with the first UE; and wherein receiving the sidelink communication comprises receiving the sidelink communication based at least in part on the redundancy version. wherein receiving the sidelink communication comprises receiving the sidelink communication based at least in part on the redundancy version.

Aspect 20: The method of any of Aspects 1 through 19, further comprising: transmitting, to the second UE, an indication of a redundancy version for the second UE to apply when the second UE is performing the sidelink communication with the first UE; and wherein receiving the sidelink communication comprises receiving the sidelink communication via a groupcast communication based at least in part on the redundancy version. wherein receiving the sidelink communication comprises receiving the sidelink communication via a groupcast communication based at least in part on the redundancy version.

Aspect 21: The method of any of Aspects 1 through 20, further comprising: determining aggregated feedback information for a plurality of UEs, wherein the aggregated feedback information indicates CSI for the plurality of UEs; and performing a multicast transmission to the plurality of UEs based at least in part on the aggregated feedback information.

Aspect 22: A method of wireless communication performed by a first user equipment (UE), comprising: transmitting, to a second UE, a sidelink communication via a physical sidelink shared channel (PSSCH); and receiving, from the second UE and based at least in part on the sidelink communication, hybrid automatic repeat request acknowledgement (HARQ-ACK) feedback and channel state information (CSI) feedback on a single physical sidelink feedback channel (PSFCH) resource.

Aspect 23: The method of Aspect 22, wherein: the first UE is a source UE and the second UE is a relay UE; or the first UE is a relay UE and the second UE is a source UE.

Aspect 24: The method of any of Aspects 22 through 23, wherein the sidelink communication is a first sidelink communication, and further comprising: transmitting, to the second UE, a second sidelink communication based at least in part on the HARQ-ACK feedback and the CSI feedback.

Aspect 25: The method of any of Aspects 22 through 24, further comprising: receiving, from a base station via a physical downlink control channel, an indication of a redundancy version index for the first UE to apply when performing a subsequent transmission to the base station, wherein the redundancy version index is applicable to the first UE or to a group of UEs that includes the first UE and the second UE; and performing the subsequent transmission to the base station based at least in part on the redundancy version index.

Aspect 26: The method of any of Aspects 22 through 25, further comprising: receiving, from the second UE, an indication of a redundancy version for the first UE to apply when performing the sidelink communication with the second UE; and wherein transmitting the sidelink communication comprises transmitting the sidelink communication based at least in part on the redundancy version. wherein transmitting the sidelink communication comprises transmitting the sidelink communication based at least in part on the redundancy version.

Aspect 27: The method of any of Aspects 22 through 26, further comprising: receiving, from the second UE, an indication of a redundancy version for the first UE to apply when performing the sidelink communication with the second UE; and wherein transmitting the sidelink communication comprises transmitting the sidelink communication via a groupcast communication based at least in part on the redundancy version. wherein transmitting the sidelink communication comprises transmitting the sidelink communication via a groupcast communication based at least in part on the redundancy version.

Aspect 28: The method of any of Aspects 22 through 27, further comprising: determining aggregated feedback information for a plurality of UEs, wherein the aggregated feedback information indicates CSI for the plurality of UEs; and performing a multicast transmission to the plurality of UEs based at least in part on the aggregated feedback information.

Aspect 29: An apparatus for wireless communication at a device, comprising a processor; memory coupled with the processor; and instructions stored in the memory and executable by the processor to cause the apparatus to perform the method of one or more Aspects of Aspects 1-21.

Aspect 30: A device for wireless communication, comprising a memory and one or more processors coupled to the memory, the memory and the one or more processors configured to perform the method of one or more Aspects of Aspects 1-21.

Aspect 31: An apparatus for wireless communication, comprising at least one means for performing the method of one or more Aspects of Aspects 1-21.

Aspect 32: A non-transitory computer-readable medium storing code for wireless communication, the code comprising instructions executable by a processor to perform the method of one or more Aspects of Aspects 1-21.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-21.

Aspect 34: An apparatus for wireless communication at a device, comprising a processor; memory coupled with the processor; and instructions stored in the memory and executable by the processor to cause the apparatus to perform the method of one or more Aspects of Aspects 22-28.

Aspect 35: A device for wireless communication, comprising a memory and one or more processors coupled to the memory, the memory and the one or more processors configured to perform the method of one or more Aspects of Aspects 22-28.

Aspect 36: An apparatus for wireless communication, comprising at least one means for performing the method of one or more Aspects of Aspects 22-28.

Aspect 37: A non-transitory computer-readable medium storing code for wireless communication, the code comprising instructions executable by a processor to perform the method of one or more Aspects of Aspects 22-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 22-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving, from a second UE, a sidelink communication via a physical sidelink shared channel (PSSCH); and
   transmitting, to the second UE and based at least in part on the sidelink communication via the PSSCH, hybrid automatic repeat request acknowledgement (HARQ-ACK) feedback and channel state information (CSI) feedback on a single physical sidelink feedback channel (PSFCH) resource,
   wherein a cyclic shift value for transmitting the HARQ-ACK feedback and the CSI feedback is selected based at least in part on a bit value associated with the HARQ-ACK feedback and a bit value associated with the CSI feedback.

2. The method of claim 1, wherein the selection of the cyclic shift value is from a group of cyclic shift values associated with equal distances between other cyclic shift values in the group.

3. The method of claim 1, wherein the selection of the cyclic shift value is from a group of cyclic shift values associated with unequal distances between other cyclic shift values in the group.

4. The method of claim 1, wherein the HARQ-ACK feedback is associated with a first bit and the CSI feedback is associated with a second bit.

5. The method of claim 4, wherein the first bit is associated with a first priority level and the second bit is associated with a second priority level.

6. The method of claim 4, wherein the first bit is associated with a most significant bit and the second bit is associated with a least significant bit.

7. The method of claim 4, wherein the first bit is associated with a least significant bit and the second bit is associated with a most significant bit.

8. The method of claim 1, wherein the HARQ-ACK feedback is associated with a first bit and the CSI feedback is associated with two or more bits.

9. The method of claim 1, wherein the transmission of the CSI feedback uses two or more PSFCH resources, wherein a same HARQ-ACK feedback is associated with each of the two or more PSFCH resources, and wherein different CSI feedbacks are associated with each of the two or more PSFCH resources.

10. The method of claim 1, wherein the transmission of the HARQ-ACK feedback and the CSI feedback uses two or more PSFCH resources, wherein a first subset of the two or more PSFCH resources is associated with the HARQ-ACK feedback and a second subset of the two or more PSFCH resources are associated with the CSI feedback.

11. The method of claim 1, further comprising:
transmitting additional CSI feedback in place of the HARQ-ACK feedback based at least in part on a negative acknowledgement (NACK)-only decoding feedback configuration associated with the first UE, wherein a NACK bit is repurposed to convey the additional CSI feedback.

12. The method of claim 1, wherein the CSI indicates one or more of: a demodulation reference signal received power, a channel quality indicator or a modulation and coding scheme based at least in part on the sidelink communication received from the second UE, a redundancy version index for a retransmission of the sidelink communication, or a data rank.

13. The method of claim 1, further comprising:
receiving, via radio resource control signaling or via a medium access control control element, an indication of quantization levels of parameters associated with the CSI feedback.

14. The method of claim 1, wherein the first UE is a source UE and the second UE is a relay UE.

15. The method of claim 1, wherein the first UE is a relay UE and the second UE is a source UE.

16. The method of claim 1, wherein the sidelink communication is a first sidelink communication, and wherein the method further comprises:
receiving, from the second UE, a second sidelink communication based at least in part on the HARQ-ACK feedback and the CSI feedback.

17. The method of claim 1, further comprising:
receiving, via a physical downlink control channel, an indication of a redundancy version index for the first UE to apply when performing a subsequent transmission, wherein the redundancy version index is applicable to the first UE or to a group of UEs that includes the first UE and the second UE; and
performing the subsequent transmission based at least in part on the redundancy version index.

18. The method of claim 1, further comprising:
transmitting, to the second UE, an indication of a redundancy version for the second UE to apply when the second UE is performing the sidelink communication with the first UE; and
wherein receiving the sidelink communication comprises receiving the sidelink communication based at least in part on the redundancy version.

19. The method of claim 1, further comprising:
transmitting, to the second UE, an indication of a redundancy version for the second UE to apply when the second UE is performing the sidelink communication with the first UE; and
wherein receiving the sidelink communication comprises receiving the sidelink communication via a groupcast communication based at least in part on the redundancy version.

20. The method of claim 1, further comprising:
determining aggregated feedback information for a plurality of UEs, wherein the aggregated feedback information indicates CSI for the plurality of UEs; and
performing a multicast transmission to the plurality of UEs based at least in part on the aggregated feedback information.

21. A method of wireless communication performed by a first user equipment (UE), comprising:
transmitting, to a second UE, a sidelink communication via a physical sidelink shared channel (PSSCH); and
receiving, from the second UE and based at least in part on the sidelink communication, hybrid automatic repeat request acknowledgement (HARQ-ACK) feedback and channel state information (CSI) feedback on a single physical sidelink feedback channel (PSFCH) resource,
wherein a cyclic shift value for the HARQ-ACK feedback and the CSI feedback is selected based at least in part on a bit value associated with the HARQ-ACK feedback and a bit value associated with the CSI feedback.

22. The method of claim 21, wherein:
the first UE is a source UE and the second UE is a relay UE; or
the first UE is a relay UE and the second UE is a source UE.

23. The method of claim 21, wherein the sidelink communication is a first sidelink communication, and wherein the method further comprises:
transmitting, to the second UE, a second sidelink communication based at least in part on the HARQ-ACK feedback and the CSI feedback.

24. The method of claim 21, further comprising:
receiving, via a physical downlink control channel, an indication of a redundancy version index for the first UE to apply when performing a subsequent transmission, wherein the redundancy version index is applicable to the first UE or to a group of UEs that includes the first UE and the second UE; and
performing the subsequent transmission based at least in part on the redundancy version index.

25. The method of claim 21, further comprising:
receiving, from the second UE, an indication of a redundancy version for the first UE to apply when performing the sidelink communication with the second UE; and
wherein transmitting the sidelink communication comprises transmitting the sidelink communication based at least in part on the redundancy version.

26. The method of claim 21, further comprising:
receiving, from the second UE, an indication of a redundancy version for the first UE to apply when performing the sidelink communication with the second UE; and
wherein transmitting the sidelink communication comprises transmitting the sidelink communication via a groupcast communication based at least in part on the redundancy version.

27. The method of claim 21, further comprising:
determining aggregated feedback information for a plurality of UEs, wherein the aggregated feedback information indicates CSI for the plurality of UEs; and
performing a multicast transmission to the plurality of UEs based at least in part on the aggregated feedback information.

28. A first user equipment (UE) for wireless communication, comprising:
a memory; and
one or more processors coupled to the memory, the one or more processors configured to:
receive, from a second UE, a sidelink communication via a physical sidelink shared channel (PSSCH); and
transmit, to the second UE and based at least in part on the sidelink communication via the PSSCH, hybrid automatic repeat request acknowledgement (HARQ-ACK) feedback and channel state information (CSI) feedback on a single physical sidelink feedback channel (PSFCH) resource,
wherein a cyclic shift value for transmission of the HARQ-ACK feedback and the CSI feedback is selected based at least in part on a bit value associated with the HARQ-ACK feedback and a bit value associated with the CSI feedback.

29. The first UE of claim 28, wherein the HARQ-ACK feedback is associated with a first bit and the CSI feedback is associated with a second bit, and wherein the first bit is associated with a first priority level and the second bit is associated with a second priority level.

30. A first user equipment (UE) for wireless communication, comprising:
a memory; and
one or more processors coupled to the memory, the one or more processors configured to:
transmit, to a second UE, a sidelink communication via a physical sidelink shared channel (PSSCH); and
receive, from the second UE and based at least in part on the sidelink communication, hybrid automatic repeat request acknowledgement (HARQ-ACK) feedback and channel state information (CSI) feedback on a single physical sidelink feedback channel (PSFCH) resource,
wherein a cyclic shift value for the HARQ-ACK feedback and the CSI feedback is selected based at least in part on a bit value associated with the HARQ-ACK feedback and a bit value associated with the CSI feedback.

* * * * *